FORWARD FEED →
← BACK FEED

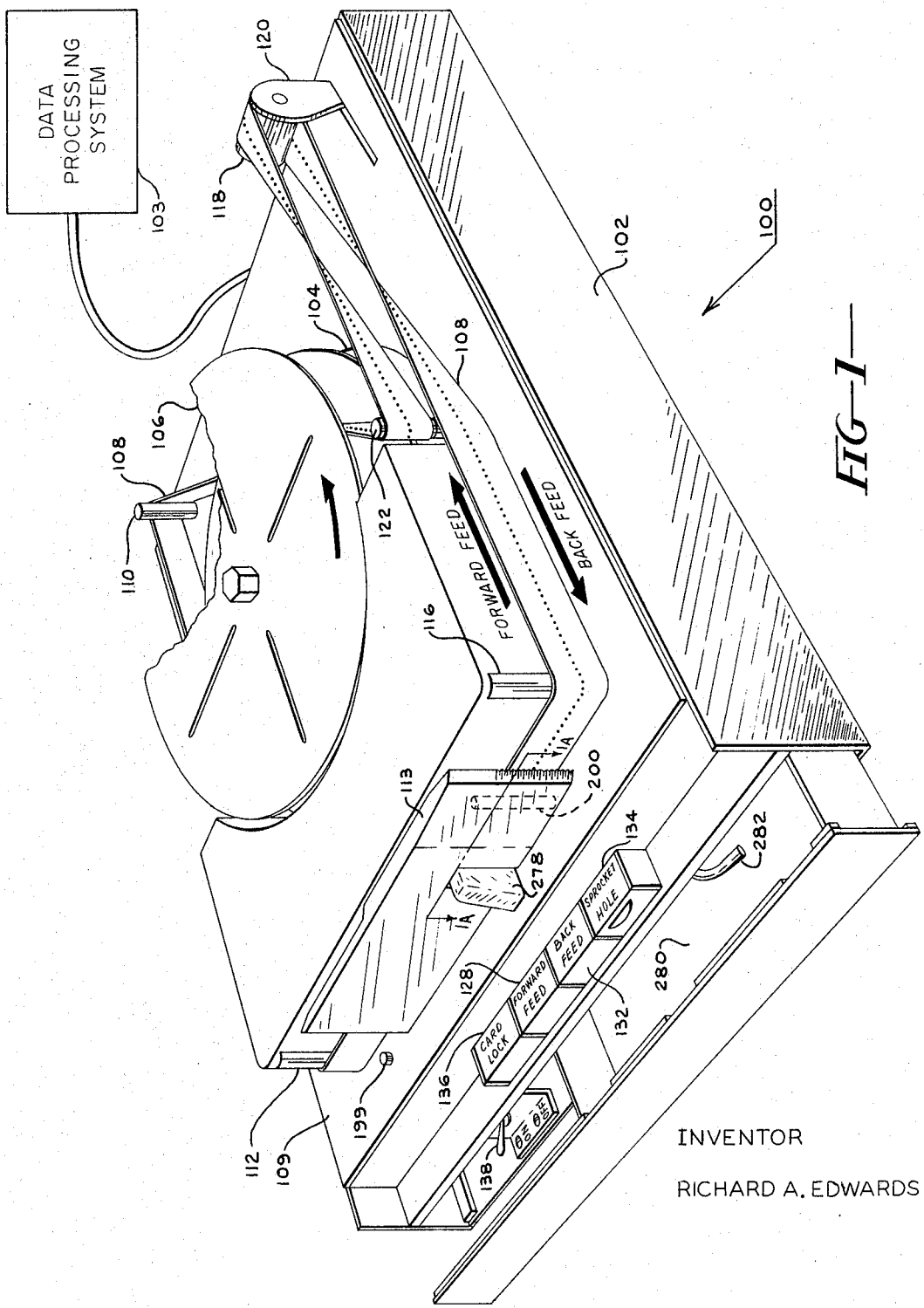

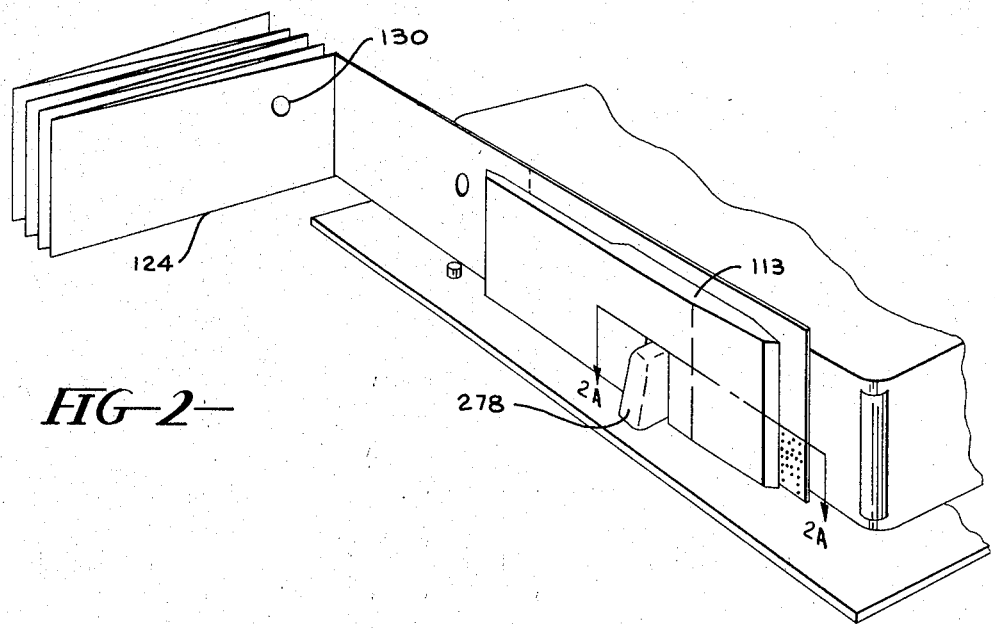
FIG-2-
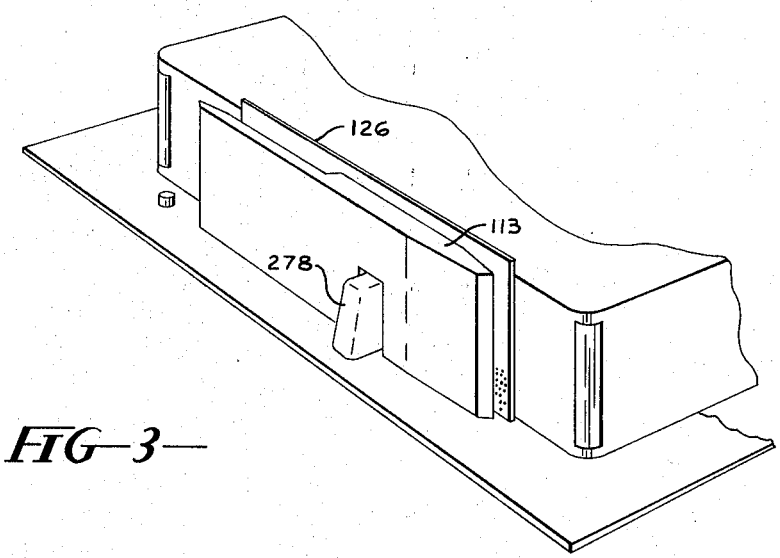
FIG-3-

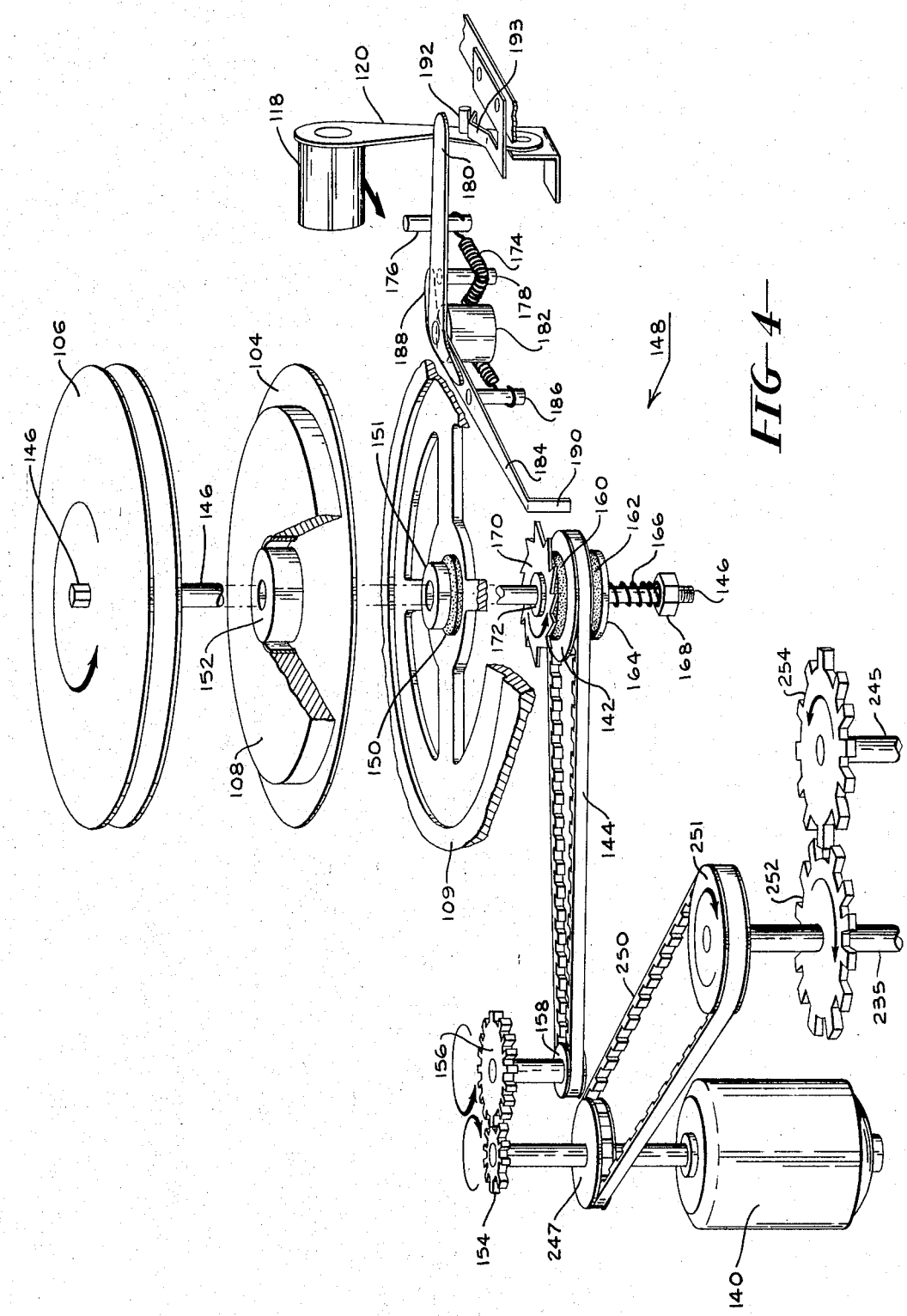

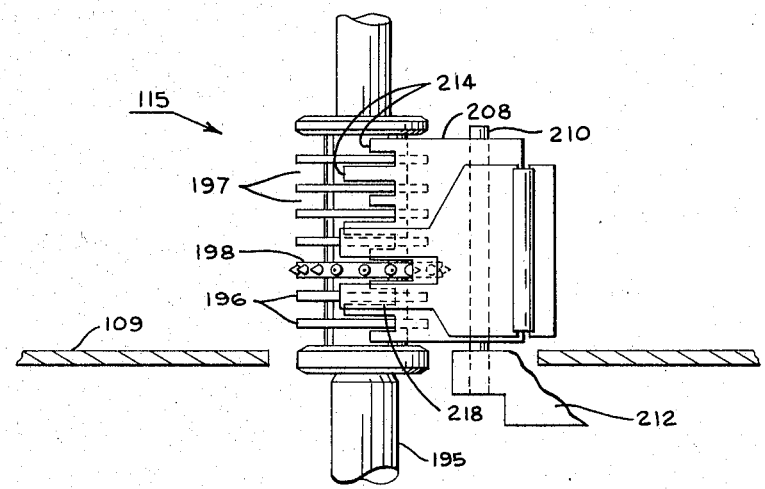
FIG-5-
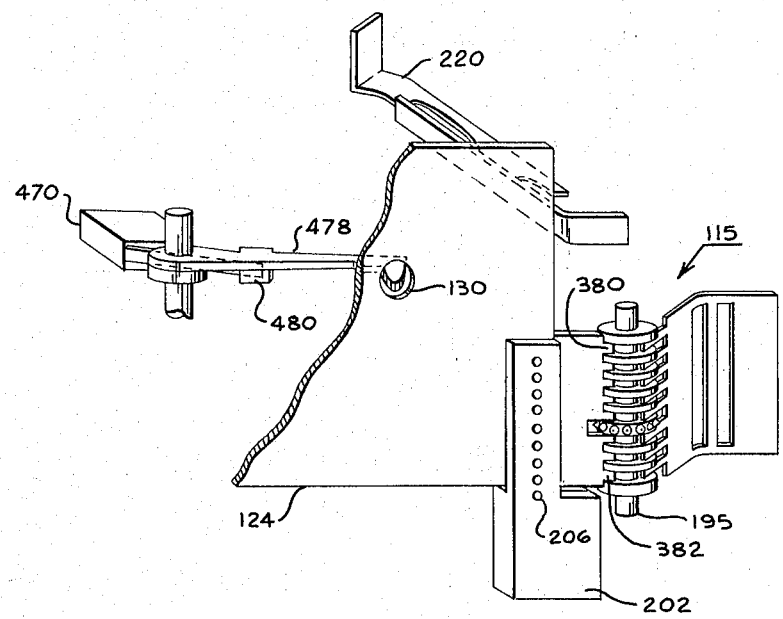
FIG-6-

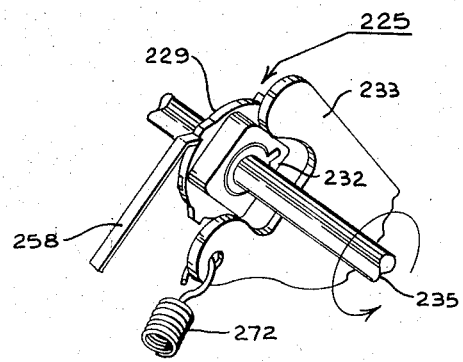
FIG-7-
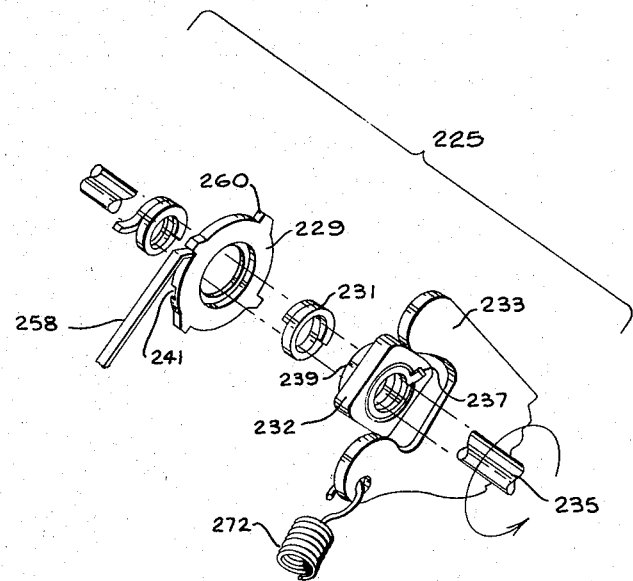
FIG-8-

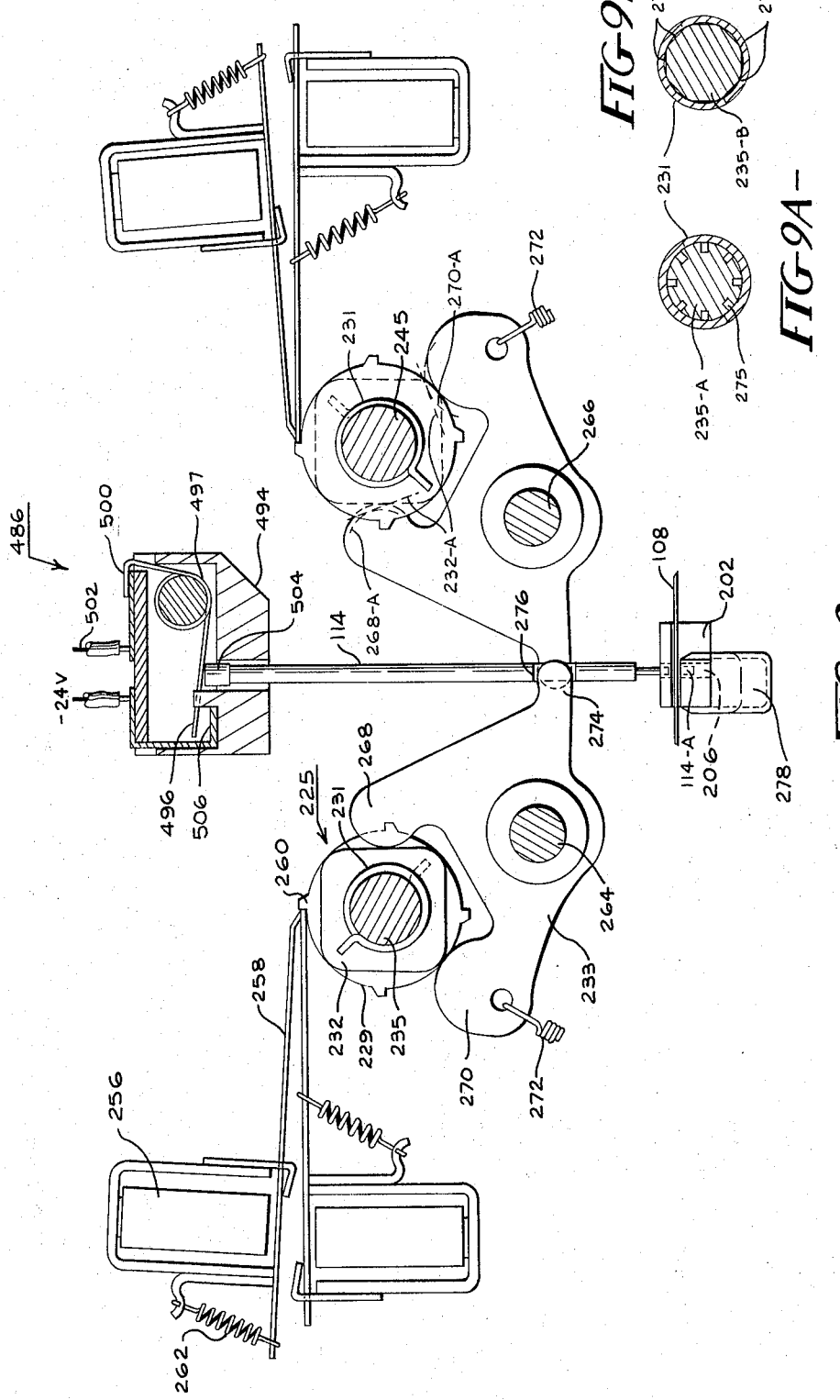

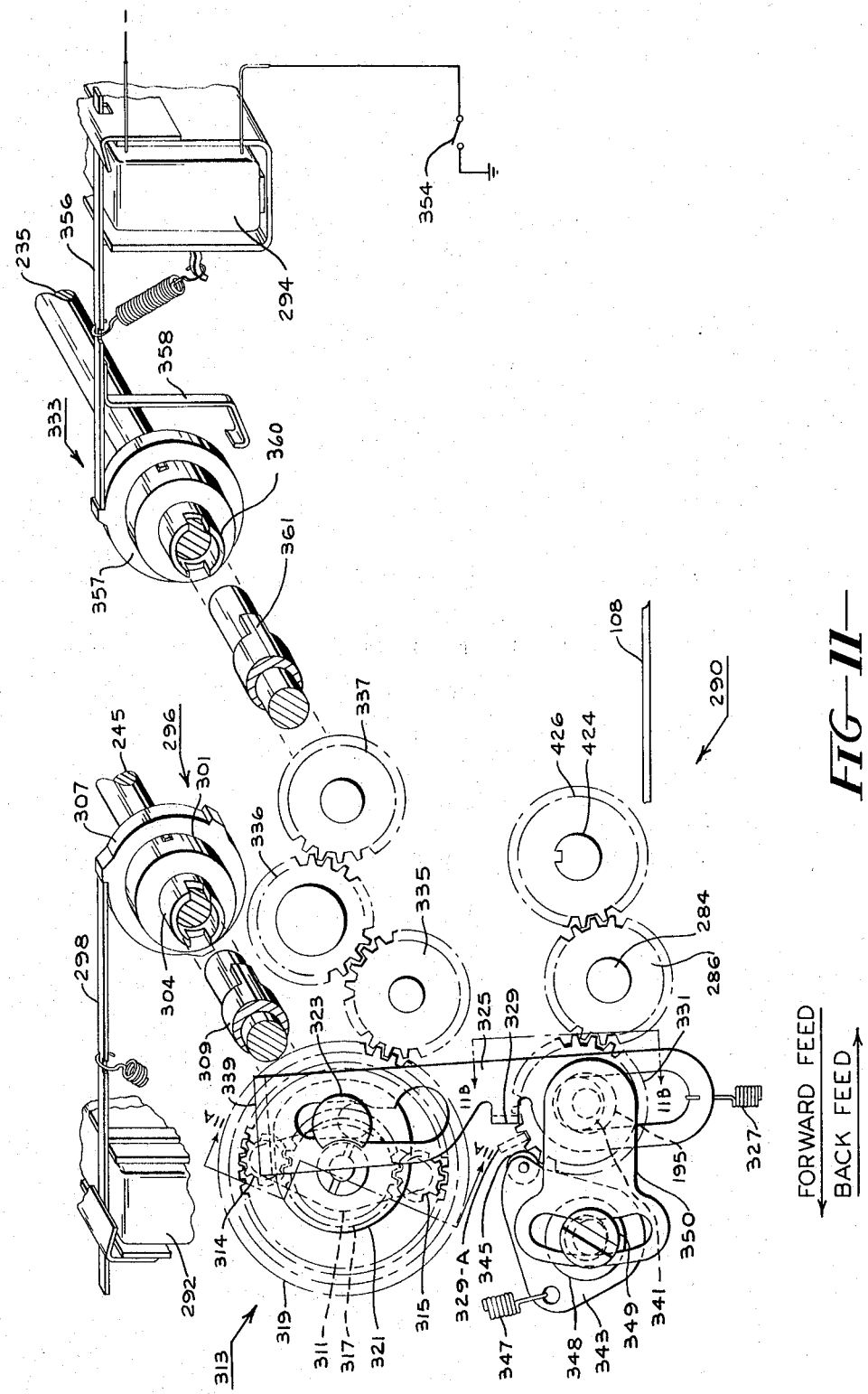

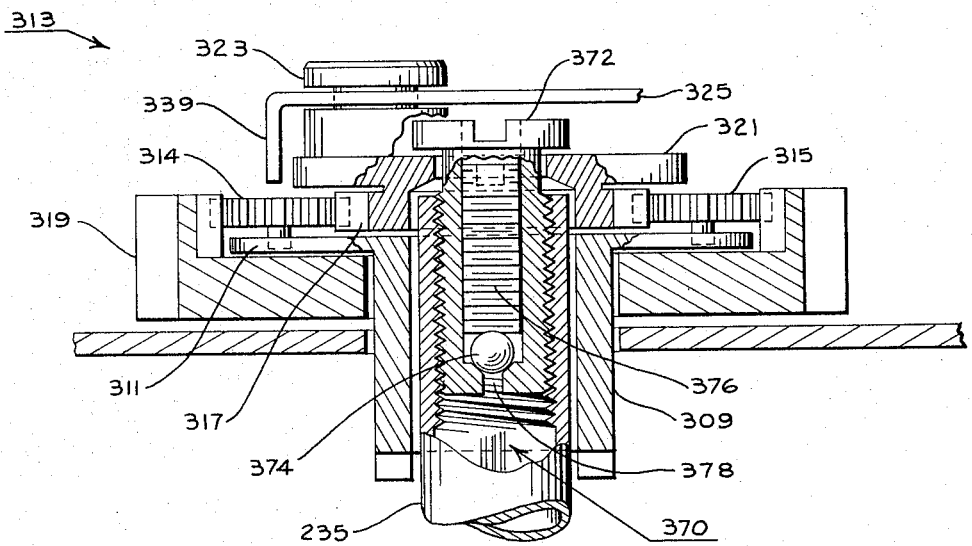
FIG-11A-
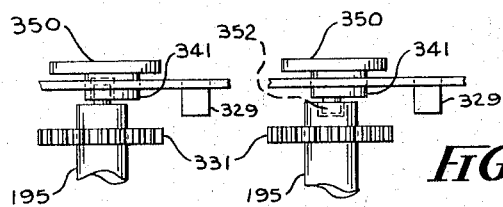
FIG-11B-
FIG-11C-
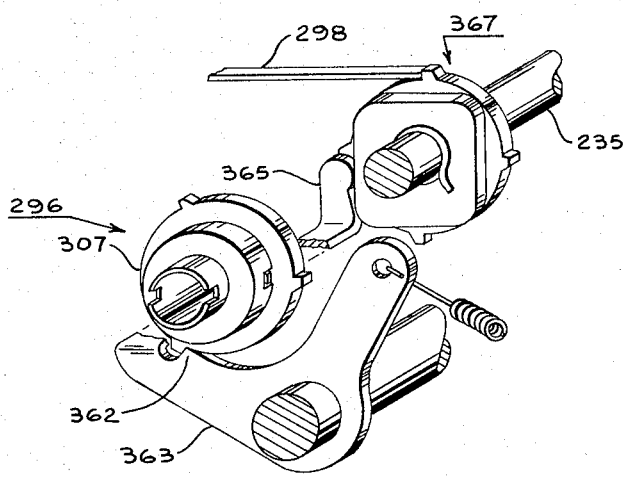
FIG-12-

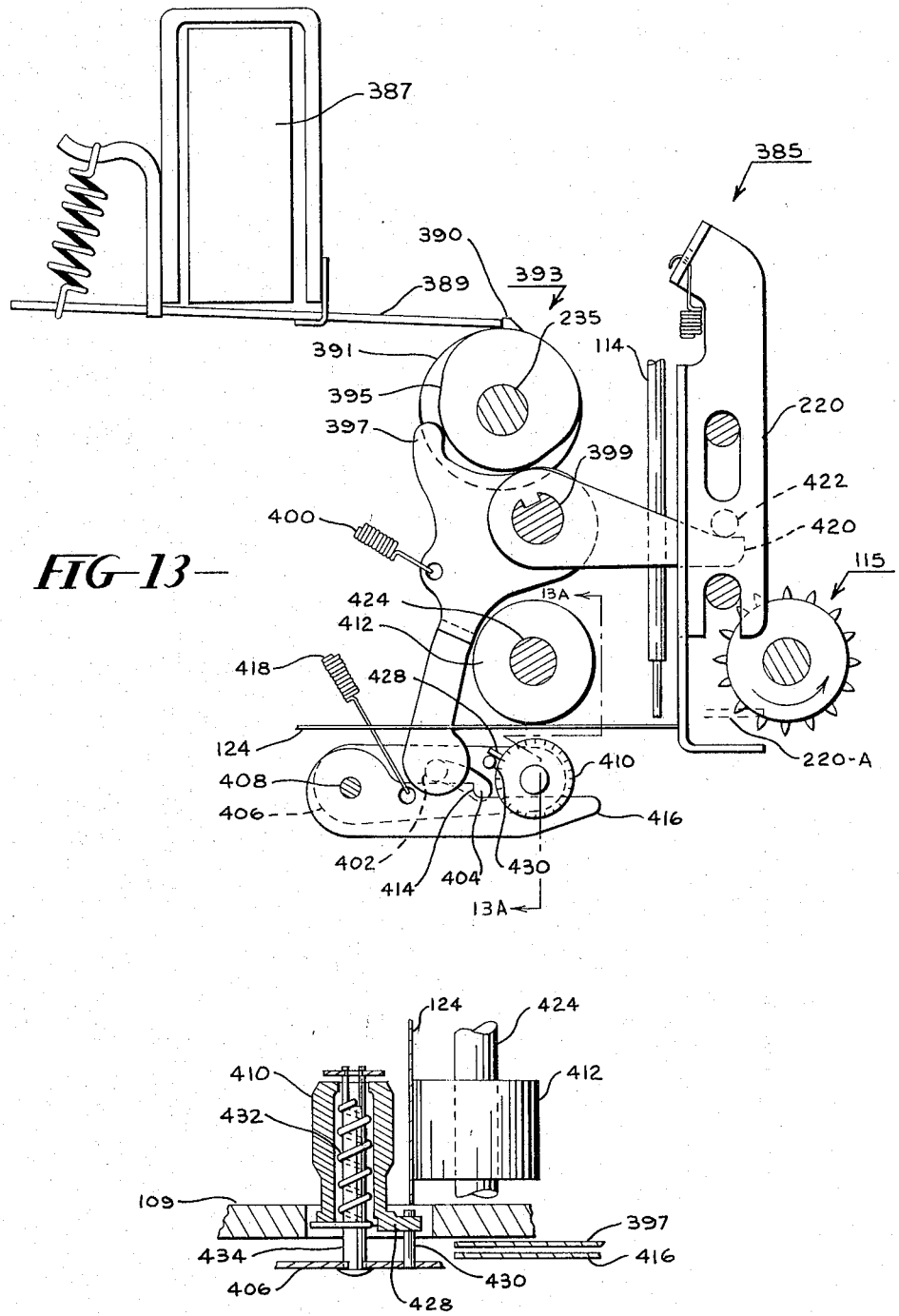

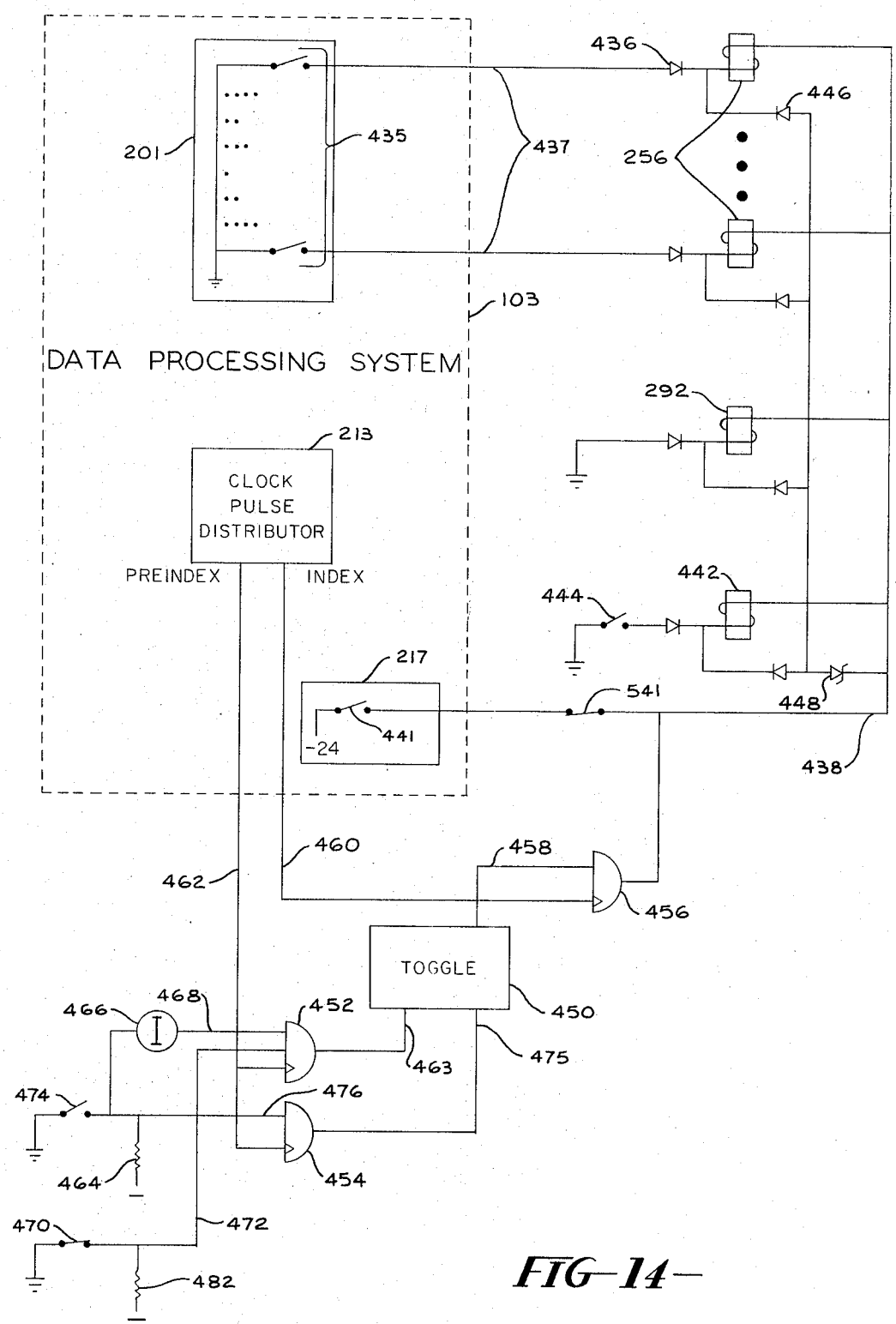
FIG-14-

# 3,301,477
PUNCHING SYSTEM
Richard A. Edwards, Walnut Creek, Calif., assignor to SCM Corporation, New York, N.Y., a corporation of New York
Filed Jan. 17, 1964, Ser. No. 338,359
19 Claims. (Cl. 234—107)

The invention relates to punching systems in which media may be perforated according to coded data received from a data source, and more particularly, the invention pertains to a high-speed asynchronous punching system for punching tape, single cards, and fanfold cards.

Punching systems are used primarily in conjunction with data processing systems for punching coded holes in a media in response to data in the form of electrical impulses transmitted thereto from a data processing system. Such data processing systems generally are capable of producing data at rates which exceed the highest operating speeds of known punching systems. Consequently, a continual effort is being made to arrange punching systems for operation at higher speeds. Some considerations in obtaining higher operating speeds include reducing the number of parts to eliminate waste of time and power in starting and stopping masses of materials, using an arrangement in which the components are as small as possible to further reduce the mass to be moved, and using an arrangement of parts that require a minimum of movement to produce the desired result. In achieving the aforementioned considerations, it is desirable, in addition, to arrange a system that is reliable and easily adjusted in accordance with modern standards of quality and serviceability. Another consideration is to arrange a punching system having the ability to punch cards as well as tape, such versatility enabling the system to punch media for use with the various types of data processing systems available. Still other considerations include arranging a system that is in physical proportion to the modern data processing systems with which the punching system normally is operated, i.e., it is desirable that the system be as compact as possible. In order that such devices may be manufactured as articles of commerce, it is necessary that all of the considerations mentioned be achieved at a low cost by means of an arrangement that is inherently inexpensive.

It is, therefore, a primary object of the invention to provide an improved punching system.

Another object is to provide a punching system having a high speed of operation.

Another object is to provide a punching system in which shaft speeds are low and punching speeds are high.

Another object is to arrange a punching system having a reduced number of parts.

Another object is to arrange a punching system comprising a punch, a clutch, and a single element therebetween for actuation of the punch upon connection of the clutch to a source of power.

Another object is to provide a simplified punching system.

Another object is to fully utilize space provided for storage of chad.

Another object is to prevent jamming and stacking of chad by means of a rotating member.

Another object is to minimize the required movement of component parts of a punching system.

Another object is to provide a punching system having punches that are positively driven in two directions by means of a cam having a surface with an even number of high and low portions.

Another object is to provide a cam follower arrangement in which the follower is engaged with the cam at two points in a position offset from the diameter of the cam.

Another object is to provide a simplified means for controlling a tape takeup reel.

Another object is to proivde a tape system having control means that is responsive to tape tension for controlling the speed of a tape takeup reel.

Another object is to provide a punching system that is easily adjusted.

Another object is to provide an improved feed mechanism requiring only simplified adjustment for smooth operation.

Another object is to arrange a feed mechanism comprising a driving member, a gear and a combined pivot and adjustment means for the driving member so as to permit fine adjustment of the driving member with respect to the gear.

Another object is to provide an improved screw fastener.

Another object is to provide a finely adjustable screw fastener.

Another object is to provide a screw fastener for reliably holding an assembly together regardless of the direction of relative rotation between components.

Another object is to arrange a punching system that feeds either tape or cards for perforation by the system.

Another object is to provide a gate having no moving parts for guiding tape in arcuate engagement with a sprocket and guiding cards in tangential engagement with the sprocket.

Another object is to minimize the number, size and complexity of parts and components in a punching system in order that such a system may be manufactured at a low cost.

Another object is to provide means for feeding card media from an index position to a position for engagement with normal feed means.

Another object is to provide a forward feed key for actuation of mechanism for continuously feeding tape as long as the key is held depressed and for automatically feeding cards upon momentary depression of the key.

Another object is to lower a sprocket with respect to a reference surface so as to force media engaged with the sprocket into engagement with the surface, thereby maintaining holes punched in the media in alignment with a punching station.

Another object is to provide an improved parity detection circuit.

Another object is to provide a simplified means for detection of parity and non-parity codes recorded on media.

Another object is to directly sense the position of punches for detection of parity of punched holes.

Another object is to arrange switches adjacent punches for operation thereby to connect a voltage source to a circuit means for producing a voltage level corresponding to the number of code holes punched.

Another object is to generate voltage levels corresponding to the number of punched code holes in a media, for detection by voltage level discriminating circuits.

Another object is to provide a voltage level discriminating circuit having only two active elements.

Other objects and advantages will appear in the following description, given by way of example only, in which:

FIG. 1 is perspective view of a punching system shown for operation with tape media.

FIG. 2 is a perspective view of a portion of the punching system of FIG. 1 shown operating with fanfold card media.

FIG. 3 is a perspective view of the punching system of FIG. 1 shown operating with a single card.

FIG. 4 is a front perspective view on a reduced scale showing mechanism for driving and controlling a tape takeup reel.

FIG. 5 is an enlarged front view of the drive sprocket showing the relationship of a tape guide and pressure spring carried by the gate with respect to the sprocket.

FIG. 6 is an enlarged front perspective view of a portion of the system showing a card positioned by index means in an index position with respect to the punching station and the sprocket.

FIG. 7 is an enlarged perspective view of spring clutch used in the punching system.

FIG. 8 is an enlarged expanded view of the clutch of FIG. 7.

FIG. 9 is an enlarged top view of punches and associated mechanism for perforating media.

FIGS. 9A and 9B are section views of alternate embodiments of the drive shaft for the spring clutches.

FIG. 11 is an enlarged bottom view of a feed mechanism partially in plan and partially in perspective.

FIG. 11A is an enlarged sectional view taken along line 11A—11A in FIG. 11 illustrating a planetary gearing system for driving the feed mechanism and a novel fastening device for holding the planetary mechanism together.

FIG. 11B is a view of an eccentric adjustment for the feed mechanism taken along lines 11B—11B of FIG. 11.

FIG. 11C is an alternate embodiment of the eccentric adjustment mechanism of FIG. 11B.

FIG. 12 is an enlarged perspective view of a delay clutch for synchronizing the feed mechanism with the punches.

FIG. 13 is a top view of a mechanism for driving card media synchronously with punching before the media is engaged with the sprocket.

FIG. 13A is a sectional view taken along lines 13A—13A of FIG. 13 of pinch rollers used to drive card media from the index position into engagement with the sprocket.

FIG. 14 is a schematic diagram showing connections from a data processing system to punch and feed solenoids and connections of a feed circuit for automatically feeding card media from one index position to another in response to momentary depression of a control key and for continuously feeding tape upon depression of the control key.

*General description*

Figure 1A:
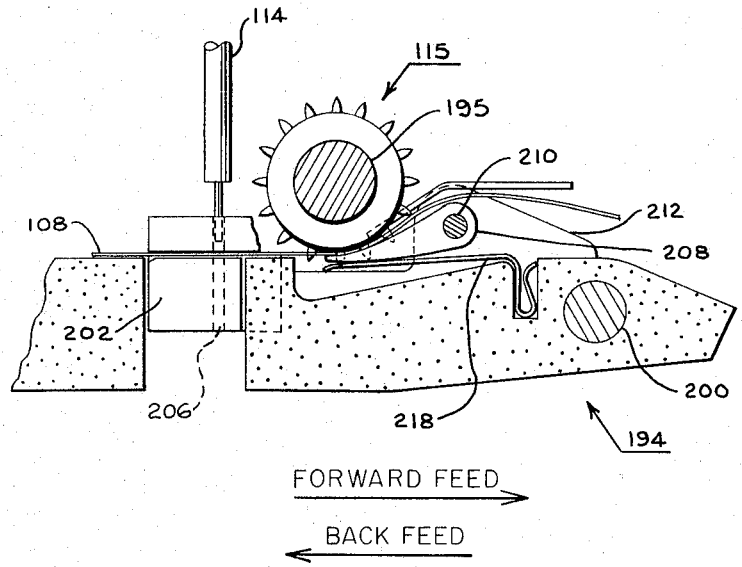
FIG. 1A is a sectional view taken along lines 1A—1A of FIG. 1 showing the relationship between a gate, a driving sprocket, a punching station, and tape media.

The present invention is shown embodied as a punching system 100 in FIG. 1, which system is assembled into a cabinet 102. The system 100 may be connected to a data source such as a Data Processing System 103 for receiving data therefrom for punching code holes in tape or card media.

A supply reel 104 and a take-up reel 106 are shown in position on the cabinet with the supply reel beneath the take-up reel. The supply reel is loaded with a paper tape media 108 which is guided from the supply reel 104 along a cabinet deck 109 by means of tape guides 110 and 112 through a gate 113 to a punching station comprising vertically arranged punches 114 (FIG. 1A) for punching coded holes in the tape. The tape is driven towards the take-up reel by means of a sprocket 115, the take-up reel being driven to take up the tape. The tape 108 is guided from the gate 113 over a guide 116, a roller 118 mounted on a tape elevator arm 120 and then around a tape guide 122 to the take-up reel 106. The roller 118 is of such a diameter as to raise the tape from the level of the supply reel to the level of the take-up reel. Alternatively, fanfold cards 124 (FIG. 2) or single cards 126 (FIG. 3) may be fed through the gate, instead of a tape 108, for punching along the edge of the card.

Four control keys are provided at the front of the cabinet 102 (FIG. 1) for control of various functions of the punch. A forward feed key 128 is provided for control of forward feeding either tape or card media without punching information holes in the media. With tape media inserted into the machine, depression of the feed key 128 causes the tape to be fed as long as the key is held depressed. With fanfold card media inserted into the machine, the media is fed without punching information holes as long as the key 128 is held depressed. In addition, however, momentary depression of the feed key 128 causes automatic forward feeding of fanfold cards until the next card is driven to an index position where a hole 130 is detected to cause the feeding to stop. In the case of a single card, the card will forward feed automatically upon momentary depression of key 128 until the trailing end of the card is sensed.

A back feed key 132 is provided for back spacing either card or tape media one code space for each depression of the key.

A sprocket hole key 134 is a two position key that is provided for controlling punching of a sprocket hole in either the tape or card media. With the key 134 depressed, a sprocket hole punch is activated to punch a sprocket hole whenever the media is fed forward. With the key 134 raised no sprocket hole is punched.

A card lock key 136 is provided for controlling the advance of either a single card or the first card of a series of fanfold cards from an index position to a position of engagement of the card sprocket holes with the sprocket 115. Initially, each single card or the first card of a series of fanfold cards manually is inserted in the gate 113 in the index position. Depression of the card lock key 136 causes automatic engagement of a pair of pinch rollers with the card for driving the card until the card is far enough rightward for engagement of the sprocket holes with the sprocket.

An on-off toggle switch 138 is provided beneath the front of the cabinet for control of power to a drive motor 140 FIG. 4. With the motor energized, a pulley 142 is continuously driven by means of a belt 144 and a gearing arrangement connected to the motor shaft. The continuously rotated gear 142 is provided for driving a shaft 146 to which the take-up reel 106 is connected. The shaft and reel are driven intermittently through a clutch assembly 148 that is responsive to tape tension. The supply reel 104 is freely mounted on the shaft 146 and rides on a felt washer 150 located between the bottom plate of the reel 104 and the cabinet 102. The felt washer is mounted around a hub 151 that extends upwardly from the cabinet deck 109 and provides a slight drag on the supply reel when the tape 108 is pulled therefrom. The drag prevents excessive unwinding of the tape when the tape is driven forward, yet is light enough to prevent breaking or tearing of the tape.

*Tape reels*

The manner in which the supply reel 104 and the take-up reel 106 are stacked on the cabinet 102 and the means for driving the take-up reel are best shown in an expanded view in FIG. 4. The supply reel 104 comprises a single lower plate having a recessed hub 152 integral therewith which is freely mounted on the shaft 146. A roll of the paper tape 108 fits over the hub 152. The hub 152 is arranged to receive the hub 151 that extends upwardly from the cabinet frame.

The take-up reel 106 comprises both an upper and lower plate which are releasably held together by suitable means not shown. A central hexagonal hole is formed in each of the plates of the take-up reel for receiving the upper end of the shaft 146 which is hexagonally formed for mating engagement with the holes. The lower plate of the take-up reel 106 rides on the hub 152 that extends upwardly from the supply reel 104. The hub 152 extends slightly above the roll of tape, providing clearance between the lower plate of the take-up reel and the tape 108 on the supply reel 104.

Upon movement of the on-off switch 138 (FIG. 1) to the "on" position, the motor 140 (FIG. 4) is energized for continuous rotation. With the motor rotating, the clutch assembly 148 continuously tends to drive the shaft 146 and the take-up reel 106 counterclockwise (CCW). Power is supplied to the pulley 142 from the motor by means of gears 154 and 156, pulley 158, and belt 144. The pulley 142 is freely mounted on the shaft 146 and is continuously driven CCW as long as the motor 140 remains "on." A pair of felt disks 160 and 162 are connected to the pulley 142 by conventional means not shown. One means for connecting the disks to the pulley utilizes pins which extend through the pulley 142 into each of the disks 160 and 162 thereby driving the disks with the pulley. A metal disk 164 is slidably keyed to the shaft 146 for engagement with the lower felt disk 162. The metal disk 164 is urged into engagement with the felt disk 162 by means of a spring 166 that is held in place by a nut 168. A ratchet wheel 170 is mounted on the shaft 146 for engagement with the upper disk 160. The wheel 170 also is keyed to the shaft 146 but is prevented from movement upward by means of a retaining washer 172 lying against a shoulder of the shaft. The spring 166 forces the entire clutch assembly 148 together so that the felt disks 160 and 162 tend to drive the shaft 146 through engagement with the ratchet wheel 170 and metal disk 162 respectively. The take-up reel 106 is driven by the hexagonal end of shaft 146 at a speed which causes the take-up reel to rotate slightly faster than the maximum speed at which the tape 108 can be fed by the sprocket 115 (FIG. 1A). This causes the tape 108 (FIG. 1) that is between the take-up reel 106 and the sprocket 115 to become tight. Sufficient tightness in this length of tape creates a tension which tends to pull the roller 118 forward. The roller 118 is mounted on the arm 120 (FIG. 4) which is pivoted on the cabinet frame. The arm 120 and roller 118 are urged rearwardly by means of a spring 174 connected at respective ends to a post 176 extending from the cabinet frame and a post 186 extending downwardly from a lever 184, the spring exerting tension on a post 178 on arm 180 which is engaged with the control arm 120. The lever 180 is pivoted on an upwardly extending frame shaft 182 to which the pawl 184 is pivoted. The spring 174 tends to pull the pawl 184 and lever 180 in opposite directions until an arm 188 of the pawl 184 engages the downward extending post 178 on the lever 180. The entire assembly is urged CCW thereby and the arm 120 and roller 118 rearward. When the length of the tape between the sprocket 115 and the roller 118 is pulled tight through rotation of the reel 106, the arm 120 is forced forward by the tape, driving the lever 180 and pawl 184 clockwise (CW) on the shaft 182. An ear 190 on the pawl 184 is provided for engagement with the teeth of the ratchet wheel 170. Whenever the tape is pulled sufficiently tight, the arm 120 and pawl 184 are rocked far enough for the ear 190 to engage the ratchet wheel teeth and thereby prevent further rotation of the shaft 146 and the take-up reel 106. During the period of engagement of the ear 190 with the ratchet teeth, the felt disks 160 and 162 slip with respect to the ratchet wheel 170 and the metal disk 164. After sufficient tape 108 is fed by means of the sprocket, the tension in the tape is relieved, permitting the spring 174 to pull the lever 180 and pawl 184 CCW, disengaging the ear 190 from the ratchet 170 and rocking the arm 120 rearward. With the ratchet 170 free to rotate, the felt disks 160 and 162 drive the shaft 146 and take-up reel 106 until tension is again produced in the tape 108 sufficient to cause the pawl 184 to re-engage with the ratchet.

When the tape 108 is back-fed upon depression of the back feed key 132, consequent tension in the tape forces the pawl ear 190 into engagement with the ratchet 170, stopping rotation of the reel 106. The arm 120, however, is free to move further forward, expanding the spring 174, until a stud 192 on the arm 120 engages a detent spring 193 secured to the cabinet frame. The stud 192 is not detented over the spring 193 but is only stopped by it. The length of tape that may be back-fed may be adjusted by positioning the detent 193 with respect to the stud 192.

When the punch system 100 is used for punching cards, rotation of the takeup reel 106 may be stopped by manually pulling the arm 120 forward until the stud 192 detents over the spring 193. This forces the pawl 184 into engagement with the ratchet 170, stopping rotation of the shaft 146 and takeup reel 106. This causes the felt disks 160 and 162 to continuously slip with respect to the ratchet wheel 170 and the metal disk 164.

Gate assembly

A gate assembly 194 (FIGS. 1A and 2A) is provided for holding tape 108 (FIG. 1A) in arcuate engagement with the sprocket 115 or for holding either cards 124 (FIG. 2A) or 126 (FIG. 3) in tangential engagement with the sprocket. The sprocket 115 (FIG. 5) is an integral unit that is force fitted to a shaft 195 and comprises disks 196 with grooves 197 formed therebetween, and a toothed disk 198 with teeth extending therefrom for engagement with sprocket holes in the media.

Prior to insertion of the tape into the system 100, a detent release button 199 is depressed to release the gate 113 and gate assembly 194 from the position shown in FIG. 1 for movement forward. The gate is pivoted on the cabinet by means of a shaft 200 that is embedded in the gate and extends therefrom into a mating hole in the cabinet. The tape 108 is then inserted in a slot in a die block 202 (FIGS. 1A and 6). The die block 202 receives and guides the vertically aligned punches 114 in holes 206. With the gate 113 open the tape is placed in front of the sprocket 115 and then around the guide 116 (FIG. 1), the roller 118 and the guide 122 into the take-up reel 106. Upon closure of the gate 113 to the position shown in FIG. 1 where the gate is maintained by means of the detent (not shown), a tape pressure guide 208 (FIGS. 1A and 5) forces and holds the tape 108 against the sprocket 115 in arcuate engagement therewith.

The tape pressure guide 208 is carried on the gate 113 by means of a shaft 210, extending upwardly from an extension 212 of the gate located below the level of the deck 109. The guide 208 comprises fingers 214 extending therefrom for mating with the grooves 197 in the sprocket. A media pressure spring 218 is mounted in a cavity in the gate 113 in engagement with the guide 208, urging the guide CW (FIG. 1A). With the tape in place, the spring 218 forces the guide 208 against the tape 108 to firmly hold the tape in arcuate engagement with the sprocket disks 196 and 198.

Figure 2A:
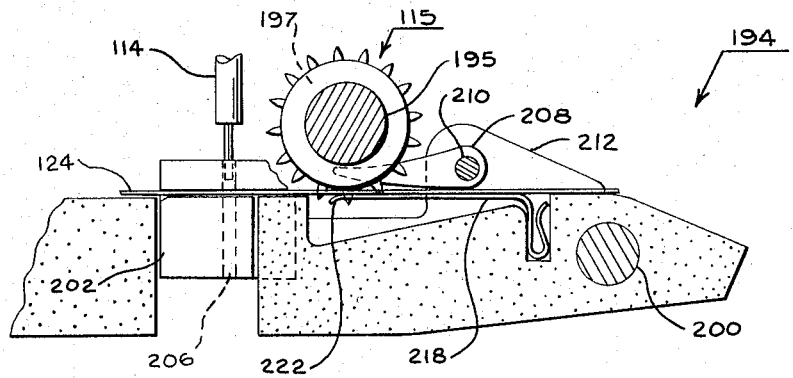
FIG. 2A is a sectional view taken along line 2A—2A of FIG. 2 showing the relationship between the gate, the sprocket, the punching station and card media.

Instead of tape 108, a card 124 may be engaged with the sprocket 115 by means of the gate assembly 194 as shown in FIG. 2A. When the card is placed in the system 100 the gate is in the closed position shown in FIG. 2; and the card is inserted in an index position as shown in FIG. 6, against a slide 220 which stands above, and does not interfere with the tape. Upon depression of the card lock key 136 (FIG. 1), the slide 220 is forced clear of the card 126, by means hereinafter described. Then the card is engaged with a pair of pinch rollers, also discussed hereinafter. Upon receipt of data from the Data Processing System 103, the card 126 is fed by the pinch rollers until the card is moved far enough rightward to engage the sprocket 115, at which time the pinch rollers are disengaged from the card to enable the sprocket to thereafter feed the card. Prior to engagement of the card with the sprocket, the spring 218 forces the tape pressure guide 208 into the mating slots 197 (FIG. 5) in the sprocket 115 to the position shown in FIG. 8A. As the card 126 is driven rightward, the leading edge of the card engages a flared portion 222 of the spring 118, leaving the tape pressure guide 208 in the slots 197 while the spring 218 is moved outward by the card. The card thereafter is held by the spring 218 in tangential engagement with the sprocket disks 197 and 198.

Spring clutch and punches

A plurality of clutches are required for operation of the system 100 according to the invention. All of these clutches may be of the type generally indicated at 225 in FIG. 7 and shown in an expanded view in FIG. 8.

The clutch 225 comprises a ratchet 229, a spring 231, a cam 232, and a follower 233. The spring 231 is mounted around a shaft 235, internal to the cam 232, with one end of the spring anchored in a notch 237 in the cam. The ratchet 229 is mounted on a hub 239 extending from the cam 232 and is provided with a notch 241 for receiving the other end of the spring 231 to anchor the spring 231 to the ratchet 229.

Whenever the system 100 is turned "on" by means of the on-off switch 138 (FIG. 1) the motor 140 (FIG. 4) is energized. Shafts 235 and a second shaft 245 are continuously driven thereafter by the motor 140 through a pulley and gearing arrangement comprising a pulley 247 mounted on the motor shaft, a timing belt 250, a pulley 251, and gears 252 and 254. All of the clutches in the system 100 are mounted on one or the other of the continuously rotating shafts 235 or 245. The clutches are shown in a top plan view in FIG. 9, one behind the other, with associated solenoids 256, armatures 258, followers 233 and punches 114.

Each clutch 225 is mounted on the shaft 235 and normally is prevented from rotating with the shaft 235 by means of the armature 258 which is engaged with one of four teeth 260 on the ratchet 229. The clutch spring 231 normally is held expanded by the holding action of armature 258 and follower 233. Upon energization of the solenoid 256 in response to data from the system 103 (FIG. 1), the armature 258 is moved upward, out of engagement with the ratchet tooth 260. This permits the spring 231 to tighten about the shaft 235. The spring 231 is wound in the direction of rotation of the shaft 235 so that as the shaft rotates, the spring is pulled more tightly into engagement with the shaft for rotation therewith. During such rotation, the ratchet 229 and cam 232 are carried with the spring 231 by means of the engaged ends of the spring 231 in the notches 237 and 241.

The solenoid 256 is only momentarily energized, by means discussed hereinafter, so that the armature 258 is immediately released and pulled back to the position shown by a spring 262 to engage the next ratchet tooth 260. Upon re-engagement with the ratchet, the spring 231 is forced to expand, thereby disengaging from the shaft 235. Any tendency of the spring 231 to tighten about the shaft 235 would move the cam 232 CW, which movement is prevented by the associated follower 233. The followers 233 are mounted on shafts 264 and 266, each follower comprising an arm 268 and 270. Whenever a ratchet tooth 260 is stopped against the armature 258, the cam 232 and follower 233 are in the positions shown with the arm 268 engaged with a low portion of the cam 232 and the arm 270 engaged with a high portion of the cam. The arm 268 is forced by means of a spring 272 against the low part of the cam 232, tending to centralize the cam in the position shown. Any tendency of the spring 231 to rock the cam 232 CW brings a higher part of the cam against the follower arm 268. This action is opposed by the force of the spring 272. The clutch, therefore, normally is maintained in the position shown, with the spring 231 disengaged from the shaft 235.

In advanced models constructed according to the invention, the ends of the spring 231 are formed in different relative positions so that when the ratchet is engaged with the armature, the cam 232 is in the position 232–A. With the cam so positioned, the follower arms 268 and 270 are in positions 268–A and 270–A respectively, leaving the punch 114 still clear of the media 108. This arrangement permits the spring 272 to hold the spring 231 expanded so that there is a greater clearance between the spring and the shaft than in the other described arrangement, thereby ensuring disengagement of the spring 231 with the shaft 245.

As discussed above, energization of a solenoid 256 releases the corresponding clutch 225 for a quarter revolution turn. The associated follower 233 is engaged continuously with cam 232. The followers 233 that are mounted on shaft 264 are reciprocated first CW and then CCW. An extension 274 of each follower 233 is engaged in a notch 276 in the corresponding punch 114. The punch 114 therefore reciprocates with the associated follower 233, each punch 114 being guided in a mating hold 206 in the die block 202. With card or tape media inserted in the slot in the die block, a hole is punched when a corresponding solenoid 256 is energized.

In a punching mechanism of the type discussed above, it is desirable to rotate shafts 235 and 245 at as low a speed as possible and yet punch at a high speed. One means of achieving a low shaft speed is to arrange the mechanism to actuate the punches 114 as often as possible during each revolution of the clutch 225. There is, however, a limit to the number of times a punch may be actuated during a clutch revolution and still obtain sufficient throw of the cam to cause a punching action. The cam also must be of a reasonable size. It was found that a cam-follower-punch arrangement of the proportions shown in FIG. 9 permitted operation of the punches 114 at a high speed while the shaft 235 was rotated at a relatively slow speed.

In addition, it is highly desirable that the punches are positively driven in unison both into and out of the media. Such an arrangement must be as inexpensive as possible in order for the final product to be competitive. A possible but expensive solution in the prior art might be to replace the cam 232 with a conventional box cam with four high points.

The cam-follower-punch arrangement according to the invention, however, is provided with the external cam 232 with four high points, an inexpensive cam compared to a box cam. The cam 232 has an even number of high points symmetrically arranged around the periphery of the cam, the cam is an external cam and positively drives a follower in two directions. Such a cam is not found in known prior art. The novel cam-follower-punch arrangement according to the invention is shown in FIG. 9 wherein a chord drawn from the point of contact between the arm 270 and the high point of cam 232 to the point of contact between the arm 268 and the low point of the cam is offset from the axis of the cam. When the cam 232 is rotated CCW, the point of contact between cam 232 and arm 268 shifts away from shaft 235 until the high point of the cam is against arm 268 and the low point is against arm 270. At this time the punch 114 is fully into the media. Then, as the cam 232 rotates to bring the punch out of the media, the point of contact between cam 232 and arm 270 shifts toward the shaft 235 back to the original point. The chord therefore varies in length during rotation of the cam and the point of contact between the cam and follower arms is continually shifting, both arms remaining in contact with the cam throughout the cam rotation. The length that the chord varies is from a first extreme equal to the distance between the midpoint of corresponding high and low portions to a length equal to the smallest diameter of the cam.

In known cam-follower arrangements in which an external cam is used, it is the practice to position the follower so that the chord between the points of contact between the follower and the cam passes through or nearly passes through the axis of the cam. If an even number of high and low portions are symmetrically arranged around the periphery of the cam, the high and low portions are diametrically opposed. It is not possible, therefore, in known arrangements to positively drive a follower in two directions by means of an even number of highs and lows. In the present invention, however, the follower engages complementary cam surfaces in such a manner that the chord is offset from the axis of the cam enabling the follower to be driven positively by the cam in two directions.

Another feature of the novel cam-follower-punch arrangement is the small number of parts required. The follower 233 is the sole element between the cam 232 and punch 114. This results in a single, compact, economical punching system 100.

Alternate embodiments of shafts which may replace either shaft 235 or 245 are shown in FIGS. 9A and 9B. A shaft 235-A (FIG. 9A) is provided with grooves or flutes 275 which run the length of the shaft, which shaft may be manufactured from commonly available fluted rod stock material. A shaft 235-B is provided with flat portions ground away from the shaft, the flat surfaces of the shaft are indicated as 277, and the remaining cylindrical surfaces as 279. Use of either shaft 235-A or 235-B in experimental models resulted in better engagement between the shaft and the spring 231. When the spring engages the shaft, the flutes or flats provide space for expansion of lubricating oil trapped between the spring and shaft. In addition, the part of the spring 231 that spans the cutaway portion of either type of shaft is free to deflect slightly therein, causing a tighter engagment between the cylindrical shaft surfaces and the spring.

Chad spreader

Figure 10:
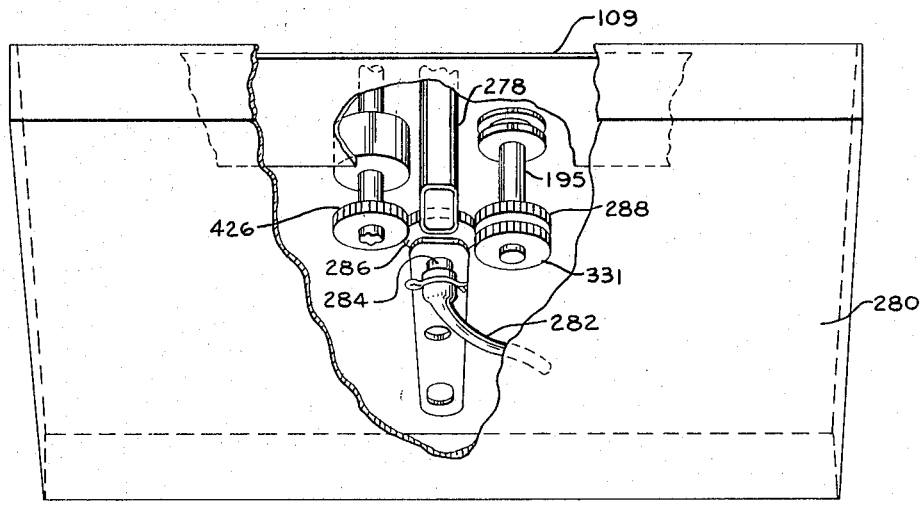
FIG. 10 is a broken perspective view taken from the lower front of the system illustrating the location and means for driving a chad spreader.

Each time a punch 114 (FIG. 9) is actuated, accumulated chad punched from successive holes in the media is pushed through the corresponding hole 206 in the die block 202. A chad chute 278 (FIGS. 1, 9 and 10) is mounted against the die block 202 to receive and guide chad into a drawer 280 (FIGS. 1 and 10), located beneath the punches 114. The chute 278 extends through the deck 109 into the drawer space. In order to prevent chad from stacking and jamming in the drawer and to evenly spread the chad, a piece of flexible tubing 282 is attached to an idler gear shaft 284 by means of a cotter pin. The length of the tube is such that it is forced to bend and cause the dependent end to lie in a plane parallel to the bottom of the chad drawer. An idler gear 286, fixed to the shaft 284, meshes with a gear 288 integral with the sprocket shaft 195. The tubing 282 therefore rotates slightly each time the sprocket is driven to feed the media. Such rotation causes the tube to "walk" in a circle around the chad drawer. This arrangement evenly disperses the chad and prevents the serious and commonly encountered problem of jamming due to stacking of chad in a conical pile which causes blocking of the chad chute. In addition, the tubing 282 evenly spreads the chad in the drawer, thereby utilizing all of the drawer space and permitting the use of a shallow drawer.

Feed mechanism

A feed mechanism 290 (FIG. 11) is provided for driving the sprocket 115 (FIG. 1A) to feed card and tape media either forward or backward, FIG. 11 being a bottom view. Upon energization of a forward feed solenoid 292 (FIG. 11), by means described hereinafter, the sprocket 115 is driven by the feed mechanism one tooth space in the CCW (FIG. 1A) direction to feed the media one code space forward (toward the right as seen in FIG. 1A). Upon energization of a back feed solenoid 294 (FIG. 11) by means discussed hereinafter, the sprocket wheel 115 is driven one tooth space in the CW direction (FIG. 1A) to feed the media one code space backward or leftward.

A forward feed clutch 296 is mounted on the continuously rotated shaft 245 (FIGS. 4 and 9) and normally is restrained from movement with the shaft by an armature 298 associated with the forward feed solenoid 292. The operation of the forward feed clutch 296 is identical in principle with that of the punch clutches 225 (FIGS. 7, 8 and 9) discussed hereinbefore; however, the cam 232 in FIG. 9 is replaced by a flange 301 having a hub 304. One end of the clutch spring 231 is anchored to the flange. The other end of the clutch spring is anchored in a ratchet wheel 307 which has three teeth spaced 120° apart. The hub 304 is mounted on the shaft 245 and is formed with notches for receiving the forked ends of a bushing 309 also mounted on the shaft 245. The bushing 309 is integral with a planetary gear carrier 311 of a planetary gearing assembly 313. (See also FIG. 11A.) The carrier 311 carries a pair of pivots for planet gears 314 and 315. The planet gears are in engagement both with a sun gear 317 and the internal teeth of a ring gear 319. Sun gear 317 is freely mounted on shaft 235 and the ring gear 319 is freely mounted on the bushing 309. Integral with the sun gear 317 is a cam 321 having a stud 323 extending therefrom into engagement with a slot in a driver 325. The driver is urged downward (FIG. 11) by a spring 327, normally holding an ear 329 on the driver in engagement with a tooth space of a gear 331 which is integral with the sprocket shaft 195 (FIGS. 1A and 5).

Upon energization of the forward feed solenoid 292 (FIG. 11), the forward feed clutch 296 is released for a one-third revolution CCW. The ring gear 319 has external teeth meshing with gear 335 and normally is held stationary by means of a disengaged, or blocked, back feed clutch 333 geared to gears 336 and 337. The ratio between the ring gear 319, the planet gears 314 and 315, and the sun gear 317 is such that one-third of a revolution of the forward feed clutch 307 and planetary gear carrier 311 causes the sun gear 317 to make one complete revolution in the CCW direction (FIG. 11). Since the cam 321 and stud 323 are integral with the sun gear, the cam and stud are carried one complete revolution CCW with the sun gear. At the beginning of the revolution, the peripheral surface of cam 321 engages an ear 339 on the upper end of the driver 325, forcing the driver upwardly. The ear 329 is carried thereby out of engagement with the gear 331. The lower end of the driver is formed with a slot which is pivoted about a stationary stud 341 of an eccentric adjustment arrangement, presently described, stud 341 being nearly coaxial with the sprocket shaft 195 (FIG. 5). As the cam 321 is rotated CCW, the driver 325 is not only raised by the high portion of the cam, but it is pivoted CCW about the shaft 341 by means of the stud 323 which is integral with the cam. As the high portion of the cam moves downwardly and away from the ear 339, the spring 327 pulls the driver downward, moving the ear into the position 329-A, in engagement with the next tooth in the gear 331. At this point the cam has completed one-half of a revolution and continues through the remainder of the revolution with the high portion of the cam out of engagement with the ear 339. The stud 323, however, continues to be driven CCW, driving against the mating slot in the driver 325. The ear 329 is driven thereby from the position 329–A to the original position, having driven gear 331 one tooth space CW to forward feed the media one code space. The slot in driver 325 comprises an arcuate portion which is concentric to the path of the stud 323, which portion is originally adjusted to be centrally contacted by the stud when in the position shown. This permits the stud to bounce upon return to the normal position and otherwise be out of normal position without moving the driver 325.

A centralizer which comprises a lever 343, a roller 345, and a spring 347 is provided for maintaining the sprocket 115 centralized during the period that the ear 329 is out of engagement with the gear 331. The lever 343 is freely mounted on a sleeve 348 by means of a set screw 349 into the frame. The inside diameter of the sleeve is larger than the outside diameter of the set screw to permit automatic adjustment of the centralizer with respect to the gear 331. When the screw 349 is loosened, the sprocket 115 and centralizer are set to an adjusted position in which sprocket holes punched in tape or card media precisely engage the teeth of the sprocket.

An eccentric adjustment arrangement is provided for precisely adjusting the position of the ear 329 with respect to the tooth spaces on the gear 331 after the sprocket is adjusted. A side view of the arrangement taken along lines 11B—11B is shown in FIG. 11B. The arrangement comprises an adjusting lever 350 (FIG. 11) having an arcuate slot in engagement with the set screw 349. The lever 350 is held by the screw against the sleeve 348. The screw 349 may be loosened to move the lever 350 for adjustment and then tightened to maintain the lever in the adjusted position. The stud 341 (FIG. 11B) extends downward from the lever 350 into engagement with the slot in the driver 325 to provide a pivot for the driver. A smaller stud 352, eccentric to the stud 341, extends downward into a mating hole in the center of the sprocket shaft 195.

Thus, CCW movement of the lever 350 (FIG. 11) from the centralized position shown moves the driver ear 329 leftward. Clockwise movement of the lever 350 moves the ear 329 rightward. This arrangement, with the ear 329 between two pivot points, i.e. studs 323 and 341, permits a very fine adjustment of the ear 329 with respect to the gear 331. Such an arrangement is possible only by making the stud 341 a combined pivot and part of an eccentric adjustment. An alternate embodiment of the eccentric adjustment is shown in FIG. 11C where a stud extends upward from the center of the shaft 195 into an eccentric mating hole in the stud 341.

The feed mechanism 290 is used also to back feed the media one code space upon depression of the back feed key 132 (FIG. 1). Depression of the back feed key closes a switch 354 (FIG. 11) to the back feed solenoid 294. When the solenoid is energized, an associated armature 356 is moved out of engagement with a single tooth ratchet 357 of the back feed clutch 333. The clutch is released thereby for a full revolution in the CW direction. If, however, the back feed key 132 is not raised by the time the clutch 333 completes a half revolution, the switch 354 remains closed and the solenoid 294 remains energized. With the armature 356 actuated thereby, an arm 358 attached to the armature is CW, in the path of the single tooth on the clutch ratchet 357. Thus, the ratchet cannot complete a revolution while the key 132 remains depressed. This arrangement prevents the feed mechanism 290 from feeding the media more than one code space for each depression of the back feed key 132.

The back feed clutch 333 is identical in principle of operation to the punch clutches 225 (FIG. 9) and the forward feed clutch 296 (FIG. 11) discussed hereinbefore. The back feed clutch comprises the single tooth ratchet 357, in which one end of a clutch spring (not shown) is anchored, and a flanged bushing 360 in which the other end of the spring is anchored. The bushing 360 is freely mounted on the rotating shaft 235 and mates by means of a pair of teeth 361 with a bushing that is integral with the gear 337. During CW rotation of the back feed clutch 333, the ring gear 319 is driven CCW through a gear train comprising gears 337, 336, and 335. Since the planetary gear carrier 311 is held stationary by means of the armature 298 acting through the clutch 296, the sun gear 317 is driven CW through the planetary gears 314 and 315. The ratio of the gear teeth is such that one revolution of the back feed clutch 333 drives the sun gear 317 one complete revolution in the CW direction from the position shown.

During the CW revolution of the sun gear, the cam 321 and stud 323 are carried CW therewith. At the beginning of the revolution, the stud 323 drives against the slot in the driver 325, pivoting the driver CCW about the stud 341. The ear 329 is carried thereby from the position shown to the position 329–A, during which movement it is held in engagement with the gear 331 by the spring 327. The sprocket 115 (FIG. 1A) is driven thereby one tooth space in the CW direction, feeding the media one code space backward. During the second half of the revolution of the sun gear 317, the cam 321 engages the ear 339 on the driver 325 carrying the driver upward and the ear 329 out of engagement with the gear 331. The stud 323 then pivots the driver 325 CW about the stud 341. As the high portion of the cam moves away from the ear 339, the spring 327 brings the ear 329 back into engagement with the next tooth space on the gear 331.

Early models of the feed mechanism 290, wherein the punch and feed solenoids were energized simultaneously, were operated satisfactorily within the system 100 since the forward feed of drive ear 329 did not move gear 331 until after the punches were withdrawn from the punch die. In order to meet manufacturing tolerances, however, it was found necessary to delay the time at which the clutch 296 is engaged to prevent the media from being fed while the punches 114 might possibly still be engaged with the media. One mode of delay used to meet the problem was by means to retard the pulse which energizes the forward feed solenoid 292. Another mode of delay is by mechanical means such as shown in FIG. 12.

In FIG. 12, the clutch 296 is shown disengaged by means of a shoulder 362 in a lever 363 which is provided in place of the armature 298 in FIG. 11. The lever 363 has a follower 365 in engagement with a cam of a clutch 367 which is identical with the clutch 225 (FIG. 9) discussed hereinbefore. The clutches are freely mounted side by side on the shaft 235. The clutch 367 normally is held disengaged from the shaft 235 by the armature 298 (FIGS. 11 and 12). Upon energization of the solenoid 292, the clutch 367 is engaged with the shaft 235 for a quarter revolution CCW. Approximately midway through the quarter revolution, the follower 365 and lever 363 are driven CCW, disengaging the shoulder 362 from the ratchet 307. The clutch 296 is engaged thereby with the shaft 235 after a delayed period to actuate the feed mechanism 290. This delayed period allows sufficient time for the punches 114 to be withdrawn from the media before the media is fed.

Screw fastener

Referring to FIG. 11A, a screw fastener 370 is shown in cross-section, which fastener was developed to reliably hold the planetary gearing 313 assembled regardless of the direction of rotation of the assembly. The fastener 370 comprises a hollow screw 372 having a shank threaded internally and externally, a ball 374, and a socket head set screw 376. The external threads of the screw 372 mate with internal threads in the shaft 235. After assembling the assembly 313 as shown in FIG. 11A, the screw fastener 370 is screwed into the end of the shaft 235 tight enough to hold the system together, yet loose enough to allow the parts to freely rotate. During this adjustment the ball 374 is loose in the bottom of the screw 372. When the adjustment is satisfactory, the set screw 376 is screwed into the fastener 372, forcing the ball 374 into a slot 378 which is cut through the diameter of the screw at the lower end. The lower portion of the threaded shank of the screw 372 is expanded against the internal threads of the shaft 235, locking the screw 372 and system 313 in adjusted positions.

Several advantages are obtained by use of the novel screw fastener 370: it is a very simple means by which the system 313 or another similar assembly may be held together in fine adjustment; the fastener 370 permits rapid adjustment, assembly and disassembly; and the fastener 370 is tight enough in the shaft 235 so that the assembly 313 is reliably held together for long periods regardless of the direction of rotation of the assembly. Furthermore, the flared edges leading to the slot 378 exert a camming action on ball 374 when the set screw 376 is withdrawn, thus insuring that the ball is not galled and locked in tightened position.

*Offset sprocket*

In early models of the invention it was found that as a card such as 124 (FIG. 2) or 126 (FIG. 3) was fed forward, it had a tendency to rise from the guiding surface or deck 109, causing holes to be punched out of place on the card. Originally, the teeth of the sprocket 115 (FIG. 5) were precisely centered in the sprocket holes of the card to theoretically cause the lower edge of the card to ride on the deck 109. It proved very costly, however, to manufacture a deck 109 flat enough to prevent the cards from rising. This difficulty was overcome successfully by offsetting the sprocket teeth toward the deck 109 by a slight amount. A satisfactory offset was found to be .003 inch. Such an offset was found sufficient to cause the card to be forced against the deck 109 at all times regardless of any irregularities in the deck but was not sufficient to tear or mutilate the sprocket holes in either card or tape media.

This optimum position of the sprocket 115 (FIG. 6) is maintained by means of an upper finger 380 and a lower finger 382 which extend from the die block 202 and mate with respective slots 197 in the sprocket. The die block is precisely manufactured to maintain the 0.003 inch offset of the sprocket with respect to the bottom of the slot in the die block. Means (not shown) are provided for adjusting the die block so that the lower edge of the slot is even with the deck 109. The sprocket 115 is maintained in position thereby, offset .003 inch from the deck 109 to guide and hold the cards against the deck.

*Card lock and feed*

A card lock and feed mechanism 385 (FIG. 13) is provided for feeding a card forward by means of an auxiliary feeding means from an index position into engagement with the sprocket 115. The card may be either an individual card 126 (FIG. 3) or the first card of a series of fanfold cards 124 (FIG. 2), the card 124 being shown in the index position in FIG. 13. In either case, the card is inserted between the gate 113 and the front of the cabinet 102 with the lower part of the card against the deck 109 and the leading edge of the card against a slide 220 (FIGS. 6 and 13). With the card so positioned, it is ready for the first holes to be punched by the punches 114. As shown in FIG. 13, the sprocket 115 is some distance rightward from the leading edge of the card 124 so that the card is not ready to engage the sprocket even after one or two holes are punched into the card. In order to feed the card rightward far enough for engagement of the card with the sprocket to permit the sprocket to drive the card after the first few holes are punched, the card lock and feed mechanism 385 must first be actuated.

After the card is indexed as shown in FIG. 13, but before the punches are actuated, the card lock key 136 (FIG. 1) is depressed. A card lock solenoid 387 is energized thereby, causing an associated armature 389 to pivot CCW. Normally, the armature 389 is engaged with a single tooth 390 of a ratchet 391. The ratchet 391 is part of a clutch 393 that is mounted on the continuously rotated shaft 235, which clutch is similar to the spring clutches 225 (FIG. 9) described hereinbefore. A cam 395 is assembled into the clutch so that upon disengagement of the armature 389 with the tooth 390, the cam 395 is driven CCW. A follower 397 is keyed to a shaft 399 and is urged CW by means of a spring 400 into engagement with the cam 395. A stud 402 extends from a lower end of the follower 397 into engagement with a camming slot 404 in a cam lever 406, the cam lever being freely mounted on a frame shaft 408. When the cam 395 is driven CCW, the stud 402 is forced CCW in the camming slot 404, forcing the cam lever 406 CCW. A knurled pinch roller 410 is mounted on the end of the lever 406 and is carried therewith firmly against the card 124. The card 124 is held tightly thereby between a pinch roller 412 and the knurled roller 410. When the stud 402 is carried fully CCW, it is in a position to the right of a shoulder 414 in a latch 416 also freely mounted on the shaft 408. A spring 418 urges the latch 416 CCW so that when the stud 402 is rightward of the shoulder 414 the latch 416 is moved slightly CCW by the spring 418, bringing the shoulder 414 to the left of the stud 402. The follower 397 is prevented thereby from being returned by the spring 400 to the position shown. With the follower 397 fully CCW, the knurled pinch roller 410 is locked in a position to hold the card 124 between the pinch rollers 410 and 412.

When the follower 397 is rocked CCW by the cam 395 as discussed above, the follower rocks the shaft 399 CCW, carrying a lever 420, also keyed to the shaft 399, CCW therewith. The right end of the lever 420 is driven against a stud 422 extending downward from the card stop slide 220 (as seen in the top view—FIG. 13) driving the slide rearward and clear of the card 124 to a position 220-A.

With the card 124 locked between the pinch rollers 410 and 412, the system 100 (FIG. 1) is ready to punch data received from the data source 103. Upon receiving such data, punching is commenced and the sprocket wheel is driven in the manner discussed hereinbefore. The pinch roller 412 is the same diameter as the sprocket disk 196 and is integral with a shaft 424 to which a gear 426 (FIGS. 10 and 11) is keyed. The gear 426 is driven at a one to one ratio by means of the idler gear 286 which in turn is driven by the gear 288 which is fixed to the shaft 195. Since shaft 195 and the sprocket 115 are driven also by means of the gear 331, the pinch roller is advanced one code space each time the sprocket 115 is driven. The card 124 is driven by means of the pinch roller 412 until the card is far enough rightward for the sprocket holes to engage the sprocket, at which time the knurled pinch roller 410 is disengaged from the card.

Such disengagement is caused by means of a protrusion 428 which extends from the lower end of the roller 410 (FIGS. 13 and 13A). Normally, the protrusion 428 rests against a stud 430 extending upward from the cam 406. Each time the card 124 is advanced rightward, however, the roller 410 is rotated CW, carrying the protrusion 428 CW therewith. After engagement of the sprocket holes with the sprocket 115, the protrusion 428 is in a position to engage the latch 416. Further rightward advance of the card 124 and CW rotation of the roller 410 drives the protrusion 428 against the latch 416, forcing the latch CW. This movement of the latch 416 lowers the shoulder 414 away from the stud 402 on the follower 397, permitting the spring 400 to rock the follower CW to the positon shown. As the follower 397 is rocked CW, the cam lever 406 is cammed CW by means of the stud 402, carrying the knurled pinch roller 410 away from the card 124. The card is released thereby from engagement with the rollers 410 and 412 and thereafter is driven solely by the sprocket 115.

Upon disengagement of the roller 410 with the card, the roller is restored to the positon shown by means of a spring 432 (FIG. 13A). The spring 432 is mounted on a stud 434 extending upward from the cam lever 406. The spring 432 is wound about the stud 434 and is internal to the roller 410, shown cut away in FIG. 13A. The upper end of the spring 432 is anchored in a slotted upper end of the stud 434, while the lower end of the spring is anchored in a slot in the lower end of the roller 410. Thus, the spring 432 urges the roller 410 CCW (FIG. 13). When the roller 410 is engaged with the card 124, the spring 432 is driven somewhat tighter upon advancement of the card so that upon disengagement of the roller with the card, the roller is free to rotate CCW to the position shown with the protrusion 428 against the stud 430.

*Solenoid and feed circuit*

The punches 114 (FIG. 9) may be actuated for punching either tape 108 (FIG. 1), cards 124 (FIG. 2) or 126 (FIG. 3) in response to data in the form of coded electrical signals received from a data source such as the data processing system 103 (FIGS. 1 and 14). The data processing system 103 is of the type in which the coded electrical signals successively appear in parallel channels at the output of the system, each channel being represented by a lead 437. Only two of the punch solenoids 256 that are shown in FIG. 9 for receiving such data are shown in FIG. 14. Any number of such solenoids 256, however, may be provided for any number of corresponding channels. In a model of the system 100, constructed according to the invention, eight such channels are provided.

With the system 100 (FIG. 1) coupled to the data source 103 (FIG. 14), data to the punch solenoids 256 may be supplied directly from a buffer storage 201 which is indicated generally as comprising a group of manually operated switches 435. Closure of a switch 435 connects a ground level voltage to one end of the winding of a corresponding solenoid 256 through an isolating diode 436. The other end of each of the windings is connected to a lead 438 to which a strobe signal is applied by means of a strobe circuit 217 to simultaneously energize those solenoids to which a voltage level is applied. The strobe circuit 217 is indicated generally as comprising a manually operated switch 441 which is closed after the switches 435 are selectively closed according to the desired code. The switches 435 and 441 are illustrative only, the switches being replaced in practice by electronic, electrical or electro-mechanical means.

Energization of the solenoids 256 causes associated punch clutches 225 (FIG. 9) to engage with respective shafts to drive the punches 114 in the manner discussed hereinbefore.

The forward feed solenoid 292 (FIGS. 11 and 14) is energized each time a strobe signal is applied over lead 438, causing the media to be fed one code space forward in the manner discussed hereinbefore.

A sprocket hole punching solenoid 442 is identical with the punch solenoids 256 and is associated with a clutch and punch similar to the clutch 225 (FIG. 9) and punch 114. The sprocket punch, however, is slightly smaller than the punches 114. The two-position sprocket hole key 134 (FIG. 1) is provided to operate a switch 444 (FIG. 14). Depression of the key 134 closes the switch 444 to connect one end of the sprocket solenoid winding to ground through an isolating diode. With the switch 444 closed, the sprocket solenoid 442 is energized whenever a strobe signal is applied to the lead 438, causing the sprocket solenoid 442 and associated punch to punch a sprocket hole in the media.

A suppression diode 446 is connected across each solenoid 256, 292, and 442, back to back with a Zener diode 448. Upon de-energization of a solenoid at the conclusion of a strobe signal, this diode circuit prevents current due to the collapsing solenoid field from flowing until sufficient voltage is built up to break down the Zener diode 448. This causes the solenoid fields to collapse more rapidly, permitting associated armatures to quickly re-engage with respective clutches.

The forward feed key 128 (FIG. 1) is provided for controlling forward feeding of the tape 108, fanfold cards 124 (FIG. 2) or single cards 126 (FIG. 3) as long as the key is held down. In the case of a single card or fanfold card, however, a single depression of the forward feed key 128 merely causes the feed mechanism 290 (FIG. 11) to automatically feed a single card until the trailing end of the card is sensed by the sensing lever 478 (FIG. 6) or to feed fanfold cards until the index hole 130 in the next card is sensed by a hole sensing lever 478. In the case of single cards, several code spaces remain for punching when the trailing edge of the card is sensed and the card may be advanced to the end by holding the feed key down. In the case of fanfold cards, the next card is in a position for punching in the first code space when the hole 130 is sensed. Whenever the forward feed key 128 is depressed, one or more strobe signals are produced the lead 438 (FIG. 14), by means of a forward feed circuit presently described, to energize the forward feed solenoid 292 and cause the feed mechanism 290 (FIG. 11) to forward feed the media in the manner discussed hereinbefore. Normally, however, the forward feed key stands in raised position so that strobe signals are available only from the strobe circuit 217 as discussed hereinbefore.

The forward feed circuit comprises a conventional toggle 450, a stop feed AND gate 452, a feed AND gate 454, and an AND gate 456. Whenever the toggle 450 is "set," it is in a condition which provides an output voltage level on a lead 458 suitable to arm the AND gate 456. When the toggle is "reset," the output voltage level on lead 458 is no longer present. Pulses from a clock pulse source such as index pulses from a clock pulse distributor 213 shown in FIGS. 5b, 11a, and 11b of a co-pending U.S. application Serial No. 162,526, filed December 27, 1961, periodically occur on a lead 460 and are applied to the gate 456. When the gate 456 is armed, the next index pulse is propagated through the gate 456 to the lead 438 for actuation of the forward feed solenoid 292. As long as the toggle 450 remains "set," successive index pulses are propagated through the gate 456 to provide a strobe signal to energize the forward feed solenoid 292 and cause the media to be fed one code space for each index pulse. Normally, the toggle 450 is maintained "reset" and does not supply an arming potential to the gate 456. The toggle 450 is "reset" by means of the stop feed gate 452. The gate 452 is arranged such that all arming potentials must be at ground level before a clock pulse can be propagated therethrough. An appropriate clock pulse may be obtained from the clock pulse distributor 213 and applied over a lead 462 to the gate 452 for propagation to a reset input 463 of the toggle 450. The gate 452 normally is armed by a negative potential that is applied through a resistor 464 and an inverter 466. A ground level arming potential is applied thereby to gate 452 over a lead 468. Another ground level arming potential is applied to the stop feed gate 452 through a normally closed hole sensing switch 470 over a lead 472. Under normal conditions, each preindex pulse from the clock pulse distributor 213 is propagated through the stop feed gate 452 to maintain the toggle in a "reset" condition. Upon depression of the forward feed key 128 (FIG. 1), an underlying switch 474 is closed to connect the input of the inverter 466 to ground instead of the negative potential. The arming ground level on lead 468 is removed thereby, preventing any further preindex pulses from being propagated through the "reset" input lead 463. The ground potential through the switch 474, however, also is applied over a lead 476 to the feed gate 454, thereby overcoming the negative potential previously applied to the lead 476 through the resistor 464. The gate 454 is arranged to be armed when the lead 476 is at ground level. The next preindex clock pulse is propagated through the gate 454 to a "set" input lead 475, thereby placing the toggle 450 in the "set" condition. The toggle 450 remains in the "set" condition as long as the forward feed key 128 is depressed and the switch 474 is closed. With the toggle 450 in the "set" condition, the gate 456 is armed, ready to propagate successive index pulses therethrough to provide a strobe pulse for energizing the forward feed solenoid 292 to feed tape media. Successive index pulses are propagated through the gate 456 to provide strobe pulses as long as the toggle 450 is in the "set" condition. Upon release of the forward feed key 128, the switch 474 is opened to again permit application of the negative potential through the resistor 464 to the lead 476. With the arming potential removed, the gate 454 is no longer armed and therefore prevents any further propagation of preindex pulses to the "set" input lead 475. With the switch 474 again open, the lead 468 is again at ground level and the stop feed gate 452 again armed, permitting the next preindex pulse to be propagated over the "reset" input lead 463 to "reset" the toggle. The arming potential is removed thereby from the lead 458, preventing the gate 456 from propagating further index pulses. Thus, feeding of the tape is stopped.

When the system 100 is operated with fanfold cards 124, momentary depression of the forward feed key 128 causes the card to be automatically fed forward until the next card is in position. Such automatic feed control is by means of the hole sensing switch 470 (FIGS. 6 and 14). The switch 470 is operated by means of the hole sensing lever 478. The lever 478 has a downward extending ear 480 in engagement with a leaf spring of the switch 470. Normally, the spring 480 holds the lever forward, permitting the switch 470 to remain closed. With tape in the system 100, for example, the lever 478 is clear of the tape and therefore remains closed. Insertion of the first of a series of fanfold cards 124 to the index position as shown in FIG. 6 positions a sensing hole 130 opposite the hole sensing lever 478. With the card in the index position therefore, the switch 470 remains closed. After the card is fed forward, however, either as a result of data being fed to the punch solenoids 256 or as a result of depression of the forward feed key 128, the lever 478 is cammed rearward, causing the switch 470 (FIG. 14) to open. With the switch 470 open, a negative potential is applied through a resistor 482 and lead 472 to the stop feed gate 452, thereby disarming the gate and preventing a preindex pulse from being propagated through the gate to the "reset" input lead as long as the switch 470 is held open. Under these conditions, depression of the forward feed key 128 closes the switch 474 to apply a ground potential over the lead 476 to the feed gate 454, thereby arming the gate to propagate preindex pulses to the toggle 450. The toggle 450 is "set" by the next preindex pulse to provide an arming potential to the gate 456 in order that strobe pulses may be applied to lead 438 for energizing the forward feed solenoid 292. Even after the forward feed key 128 is released and the switch 474 opened, the toggle 450 remains in the "set" condition since the stop feed gate 452 is disarmed by the negative potential on lead 472. Strobe pulses are successively generated thereby on the lead 438 to energize the solenoid 292. The card 124 is fed forward until the next hole 130 is opposite the sensing lever 478 to permit the switch 470 to close. The ground level arming potential is again applied to the stop feed gate over the lead 472. The feed toggle is "reset" thereby causing removal of the arming potential on the lead 458 to block application of strobe pulses to lead 438. Alternatively, the forward feed key 128 may be held down, causing continuous forward feeding of the fanfold cards 124 from one card to another.

Automatic forward feeding is also effective with single cards 126. In this case, however, the single card is automatically fed forward in response to momentary depression of the forward feed key 128 until the trailing edge of the card is sensed by the lever 478 which then closes the switch 470 to stop the automatic feeding operation.

*Parity detection apparatus*

Figure 15:
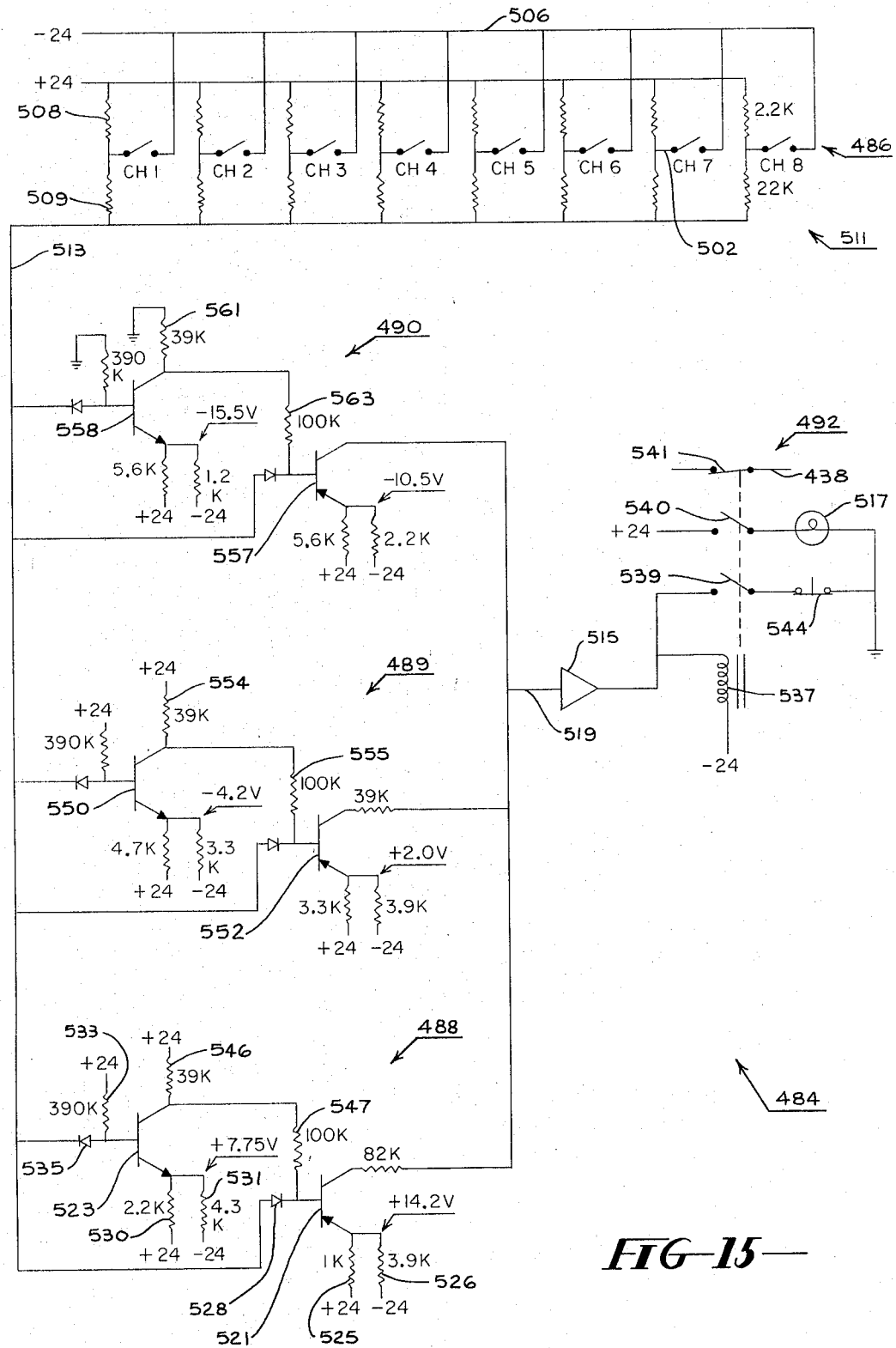
FIG. 15 is a circuit diagram of a parity detection circuit comprising voltage level discriminating circuits for detection of parity and non-parity conditions.

A parity detection apparatus 484 is shown in FIG. 15 for indicating whether the number of code holes punched in tape or card media for each character is odd or even. The parity detection apparatus 484 comprises a group of channel switches 486 1–8, voltage level discriminating circuits 488, 489, and 490, and a display means 492. Each of the switches 486 is under control of a corresponding punch 114 (FIG. 9) and are mounted in a switch block 494 shown cut away with each punch 114 extending therethrough into engagement with a lower switch arm 496 of a corresponding switch spring 497. The springs 497 are mounted on a shaft 498 which runs the length of the switch block 494 and is embedded in the ends of the block. An upper arm 500 of each spring extends through an opening in the block 494 for connection to a respective lead 502 (FIGS. 9 and 15). The lower arm 496 normally is held in the position shown by the corresponding punch 114. The upper end of each punch 114 carries a plastic cap 504 for engagement with the switch arm 496 to provide electrical isolation of the switch from the frame of the system 100. Movement of a punch 114 to the punching position 114–A permits the arm 496 to spring into engagement with a common contact 506. The contact 506 runs the length of the switch block 494 for contact with each of the switch arms 496. The contact 506 extends upward through an opening in the switch block and is connected to a −24 volt source.

Eight switches 486 are shown in FIG. 15 for cooperation with eight corresponding punches 114. An arrangement of eight such switches and corresponding punches were provided in a model constructed according to the invention. The novel principles of the parity detection apparatus 484, however, may be used with a greater or smaller number of punches and switches and corresponding circuitry, the number being a matter of choice only. Each of the output leads 502 is connected to branch resistors 508 and 509 of a conversion circuit 511. Each branch of resistors 508 and 509 are connected in series between a +24 volt source and an output lead 513. Consequently, with all of the switches 486 open, lead 513 is at +24 volts. Upon closure of one switch 486, for example channel switch 486–1, the point connecting the resistors 508 and 509 is connected through the switch 486–1 to the −24 volt source. Current is drawn thereby through the resistor 509 from the +24 volt source by means of branch resistors 508 and 509. Closure of one channel switch 486 causes the voltage on lead 513 to drop to +17.5 volts. Closure of additional switches 486 causes the voltage on lead 513 to drop proportionately. With all eight of the switches 486 closed, the voltage on lead 513 is −24 volts. The other voltage levels on lead 513, corresponding to the number of switches closed, are indicated below in Table I.

TABLE I

| Number of Closed Switches | Voltage Level on Lead 513 | Lamp 517 Lighted |
|---|---|---|
| 0 | +24 | No. |
| 1 | +17.5 | No. |
| 2 | +11.0 | Yes. |
| 3 | +5.0 | No. |
| 4 | −1.0 | Yes. |
| 5 | −7.0 | No. |
| 6 | −13.0 | Yes. |
| 7 | −18.5 | No. |
| 8 | −24.0 | No. |

The code for which the parity detection apparatus was arranged has no combinations of bits which result in an even number of punched holes or bits, excepting a delete code (eight holes). This, closure of zero, one, three, five, seven or eight channel switches is a condition of parity while closure of two, four, or six channel switches is a condition of non-parity. This arrangement, however, is a matter of choice only. Any punching which results in a character having an even number of holes excepting eight is therefore an error. Closure of two, four, or six of the switches 486 results in a voltage level on lead 513 of +11, −1 or −13 volts respectively. These voltage levels are detected by means of a corresponding one of the voltage level discriminating circuits 488, 489, and 490. The outputs of the voltage level discriminating circuits are connected to the display means 492 through a conventional amplifier 515. The display means is responsive to the detection of voltage levels corresponding to two, four, or six closed switches 486 to energize a lamp 517.

The operation of the voltage level discriminating circuits may be discussed generally by reference to Table I. With all channel switches 486 open, +24 volts is applied to lead 513 and none of the circuits 488, 489 or 490 cause the lamp 517 to glow. When one channel switch 486 is closed, a level of +17.5 volts is applied to the lead 513 and still the lamp 517 is not energized. When two channel switches are closed, +11 volts is applied to the inputs of the circuits 488, 489 and 490. This voltage level causes the circuit 488 to produce an output on a lead 519 that causes the lamp 517 to glow, indicating that an error has been detected, i.e. a non-parity code has been punched. When three contacts are closed, +5 volts are applied to lead 513; none of the circuits 488, 489 or 490 produce an output to cause the lamp 517 to glow. With four channel switches closed, −1 volt is applied to the lead 513, the circuit 489 produces an output that causes the lamp 517 to glow to indicate a non-parity condition. With five switches closed, −7 volts is applied to the lead 513; none of the circuits 488, 489 or 490 are responsive to that voltage to produce an output that causes the lamp 517 to glow. With six channel switches closed, −13 volts is applied to the lead 513; the circuit 490 is responsive thereto to produce an output on the lead 519 that causes the lamp 517 to glow. With seven or eight channel switches closed, −18.5 volts and −24 volts respectively are applied to the lead 513, which voltages are ineffective to produce an output in any of the circuits 488, 489 or 490 that will cause the lamp 517 to glow. Thus, a combination of two, four or six closed switches produces corresponding voltages to which one of the circuits 488, 489 or 490 are responsive to provide an output that causes energization of the lamp 517.

More specifically, each of the voltage level discriminating circuits 488, 489 and 490 comprises two active elements, one of which is normally conducting and the other is normally cut off. For example, the circuit 488 comprises a normally cut off PNP transistor 521 and a normally conducting NPN transistor 523. The emitter of the PNP transistor 521 is maintained at +14.2 volts by means of bias resistors 525 and 526. The base of the transistor 521 is maintained normally at +24 volts applied through the resistors 508 and 509 and a diode 528 when the switches 486 are all open. With the base of the PNP transistor 521 thus maintained at a voltage that is higher than the voltage applied to the emitter, the transistor remains cut off. The emitter of NPN transistor 523 is maintained at +7.75 volts by means of bias resistors 530 and 531 while +24 volts normally is applied through a resistor 533 to the base of the transistor. As long as the voltage at the base of the NPN resistor 523 is higher than the voltage applied to the emitter, the transistor conducts so that the voltage on the collector is very close to the +7.75 volts applied to the emitter.

When one of the switches 486 is closed, +17.5 volts (Table I) is applied to the base of the transistor 521. Since +17.5 volts is greater than the +14.2 volts applied to the base, the transistor remains cut off. The +17.5 volts also appear at the base of the transistor 523, the voltage being due to current drawn from the +24 volt source through the resistor 533 and a diode 535 to the circuit 511. The purpose of the diode 535 is to prevent an excessive base current in the transistor 523. Such a current would be drawn through the conversion circuit 511 when all switches are open. Since the +17.5 volts applied to the base is higher than the +7.75 volts applied to the emitter, the NPN transistor 523 remains conducting.

Upon closure of two channel switches, +11 volts is applied to the bases of the transistors 521 and 523. Since the +11 volts is less than the +14.2 volts applied to the emitter of transistor 521, the transistor conducts, the signal therefrom being applied to the amplifier 515 over lead 519. The amplifier 519 in turn energizes a relay 537 and closes associated contacts 539 and 540 and opens a normally closed contact 541. A holding circuit for the relay is established thereby through the contact 539 and a circuit opening switch 544. The lamp 517 is made to glow by current through the contact 540, indicating that a non-parity code has been punched. The normally closed contact 541 (FIGS. 14 and 15) is in series with lead 438 over which strobe pulses are supplied to the punch and feed solenoids 256 and 292. Opening of contact 541 upon energization of relay 537 prevents strobe pulses from being applied to punch and feed solenoids 256 and 292 and therefore stops operation of the punching system 100. Upon correction of the non-parity condition, the circuit 492 and systems 100 and 103 may be restored to normal condition by opening the switch 544 and breaking the holding circuit.

Upon closure of three channel switches 486, +5 volts is applied to the base of the transistor 523. Since +5 volts is less than the +7.75 volts applied to the emitter, the transistor ceases conduction and is cut off. As long as the transistor 523 is conducting, the current from the collector to the emitter is drawn through resistor 546, thereby maintaining the collector at approximately +7.75 volts. Upon cut off of the transistor 523, +24 volts is applied through resistors 546 and 547 to the base of the transistor 521. Thus, with three or more channel switches closed, the voltage applied to the base of the transistor 523 maintains the transistor 523 cut off, causing +24 volts to be applied to the base of the transistor 521. Since the +24 volts applied to the base of the transistor 521 is greater than the +14.2 volts applied to the emitter, the transistor 521 is maintained cut off. The diode 528 prevents the voltage at the base of transistor 521 from following the voltage applied to the lead 513 to thereby maintain the +24 volts on the base.

The circuit 489 also comprises two active elements, a normally conducting NPN transistor 550 and a normally cut off PNP transistor 552. The emitter of the transistor 552 is maintained at +2 volts while the emitter of the transistor 550 is maintained at a −4.2 volts. Closure of three or less channel switches 486 produces voltages of not more than +5 volts on lead 513, any of which voltages are too high to cause any change in the normal condition of the circuit 489. Upon a closure of four channel switches, however, a −1 volt is applied to the base of the transistor 552. The −1 volt is less than the +2 volts bias applied to the emitter, thereby causing the transistor to conduct and the display means 492 to operate. The −1 volt, however, being more positive than the −4.2 volts, leaves the transistor 550 fully conducting.

Upon closure of five channel switches 486, a −7 volts is applied to the base of the transistor 550. Since −7 volts is less than the −4.2 volts applied to the emitter, the transistor ceases conduction and is cut off. A +24 volts is applied thereby through resistors 554 and 555 to the base of the transistor 552 to cause the transistor to cut off. When any more than five channel switches are closed, a more negative voltage is applied to the base of the transistor 550, thereby cutting the transistor off and causing the bias at the base of the transistor 552 to rise to +24 volts to maintain the transistor 552 cut off.

The circuit 490 also comprises two active elements, a normally cut off transistor 557 and a normally conducting transistor 558. Upon closure of six channel switches 486, a −13 volts is applied to the base of the transistor 557, which voltage is less than −10.5 volts normally applied to the emitter of the transistor. With the base more negative than the emitter, the transistor conducts, causing the display means to indicate a non-parity condition in the manner discussed hereinbefore. The −13 volts is applied also to the base of the transistor 558 but is still less than a −15.5 volts normally applied to the emitter of the transistor. The transistor 558 therefore remains in a conducting state. With either seven or eight channel switches closed, a −18.5 volts or a −24 volts respectively are applied to the base of the transistor 558, causing the transistor to cut off. With the transistor cut off, a ground potential is applied through resistors 561 and 563 to the base of the transistor 557, thereby maintaining the base of the transistor positive with respect to the emitter to keep the transistor cut off.

It is thus seen that closure of two, four or six channel switches causes the lamp 517 to glow, indicating that a non-parity condition has been detected. Any other combination of closed switches corresponds to a parity condition and therefore may be detected by the "off" condition of the lamp 517.

A particular advantage of the parity detection apparatus of the present invention is that each voltage level on lead 513, which level indicates the aggregate number of punched holes, is obtained as a result of movement of the individual punches. Another possible arrangement is to provide connections directly from the solenoid input leads 437 (FIG. 14) to a conversion circuit similar to 511 for conversion to a single signal proportional to the aggregate number of signals, on the leads 437. Such an arrangement, however, would not detect misoperation of the intervening mechanism as to whether holes are punched or not punched. Still another possible arrangement is to detect the punched holes after punching is carried out. This arrangement, however, would require extensive additional mechanism and/or circuitry. The arrangement of the present invention whereby the motion of the punches is detected directly is simple, convenient, and highly accurate.

The invention claimed is:
1. A punch comprising:
 (a) an electromagnetic device;
 (b) means for operating said electromagnetic device;
 (c) a latch operated by said electromagnetic device;
 (d) a constantly rotating shaft;
 (e) an escapement member carried on said shaft and normally restrained from rotation with said shaft by engagement of said latch with one of a plurality of stop means on said escapement member;
 (f) a cam having a surface with a high portion and a low portion, said cam being mounted on said constantly rotating shaft;
 (g) a spring clutch anchored to said cam and said escapement means for connecting said cam and said escapement member to said shaft for rotation therewith upon disengagement of said latch with said stop means;
 (h) a second shaft;
 (i) a follower mounted on said second shaft for rocking thereabout and having first and second surfaces continuously engaged with said cam surface, a chord between concurrent points of contact of said cam with said first and second follower surfaces being offset from the center of axis of rotation of the cam;
 (j) a die having a recess therein;
 (k) a punch aligned with said recess and reciprocated by said follower into and out of the recess upon connection of said constantly rotating shaft to said cam.

2. A punch according to claim 1 wherein a resilient means is connected to said follower to constantly urge said first follower surface against said cam surface so that during engagement of the latch with one of said stop means on said escapement member said first follower surface is urged in a direction to engage the cam and prevent the engaged one of said stops from moving away from said latch.

3. A punch according to claim 1 wherein said cam surface has an even number of high and low portions, which surface is continuously engaged with the follower at two points offset from the center of the axis of rotation of the cam.

4. A punching device according to claim 3 wherein said cam comprises four high portions to actuate said punch four times for each revolution of the cam.

5. In a punching device according to claim 1 wherein said cam surface has more than two high portions and said follower is the sole connection between said cam and said punch to cause more than two punching cycles for each revolution of the cam.

6. In a punching device according to claim 1 wherein said follower engages the periphery of the cam.

7. A cam device comprising:
 (a) a shaft;
 (b) means for rotating said shaft;
 (c) a cam having a surface with a plurality of high and low portions said cam being mounted on said shaft for rotation therewith; and
 (d) a follower having first and second surfaces continuously engaged with said cam surface, a chord between concurrent points of contact of said cam with said first and second follower surfaces being offset from the axis of the shaft.

8. A cam device according to claim 7 wherein said follower is mounted on a shaft for rocking thereabout during rotation of said cam.

9. A cam device according to claim 7 wherein said cam has an even number of high portions and a corresponding number of low portions.

10. A cam device according to claim 9 wherein said cam has four high portions and four low portions.

11. A cam device according to claim 7 wherein said follower rides on the periphery of the cam.

12. A cam device according to claim 7 wherein said first and second follower surfaces are smoothly curved for continuous shifting engagement with said cam surface, the chord between concurrent points of contact of said cam surface with said first and second follower surfaces varying in length between first and second extremes as said cam is rotated.

13. A cam device according to claim 12 wherein said first extreme length is equal to the smallest diameter of the cam and said second extreme length is equal to the length of a chord between the midpoint of a high portion of the cam surface and the midpoint of a low portion of the cam surface.

14. In a punching device for punching holes in a media and thereby forming chad, said device comprising:
 (a) a chad chute adjacent said media for receiving said chad;
 (b) a chad chamber having a flat floor and being connected to said chute for collection of said chad; and
 (c) a punch drive mechanism;
 (d) distributing means operable by said punch drive mechanism comprising a rotating shaft with a length of flexible tubing having one end connected to said shaft and the free end extending into said chamber, at least a portion of said member being angularly displaced from the axis of said shaft and the free end being in contact with said floor for distributing said chad evenly about said chamber to fully utilize the capacity of the chamber and to prevent stacking and jamming of the chad in the chad chute.

15. A punch comprising:
(a) a rotating shaft;
(b) a cam freely mounted on said shaft and having a surface with a plurality of high and low portions;
(c) a normally disengaged clutch, operable when engaged to connect the cam to the shaft;
(d) a follower having first and second surfaces continuously engaged with said cam surfaces and oscillated thereby upon rotation of the cam by the shaft;
(e) and a punch pin connected to said follower and oscillated thereby to effect a punching motion.

16. A punch as defined in claim 15 including yieldable means connected to said follower to urge one surface of said follower against a low portion of said cam and centralize the same when the clutch is disengaged.

17. A punch as defined in claim 15 and in which:
(a) the clutch comprises a spring, one end of which is fixed to a ratchet and the opposite end of which is fixed to the cam; and
(b) a clutch disengaging element normally standing in a blocking position with respect to a tooth of said ratchet to hold the clutch disengaged.

18. A punch as defined in claim 17 in which said clutch disengaging element may be moved to clutch engaging position by energization of a solenoid.

19. A punch as defined in claim 17 in which the clutch disengaging element may be moved to clutch engaging position at any time during 360° of rotation of the drive shaft.

References Cited by the Examiner
UNITED STATES PATENTS 3,198,428  8/1965  Busch _____ 234—119

FOREIGN PATENTS 664,728  6/1963  Canada.

WILLIAM S. LAWSON, *Primary Examiner.*